(12) United States Patent
Sogabe

(10) Patent No.: US 7,566,020 B2
(45) Date of Patent: Jul. 28, 2009

(54) TAPE CARTRIDGE AND RECORDING/REPRODUCING APPARATUS

(75) Inventor: Teruo Sogabe, Osaka (JP)

(73) Assignee: Hitachi Maxell, Ltd., Osaka (JP)

( * ) Notice: Subject to any disclaimer, the term of this patent is extended or adjusted under 35 U.S.C. 154(b) by 351 days.

(21) Appl. No.: 11/703,737

(22) Filed: Feb. 8, 2007

(65) Prior Publication Data

US 2007/0205316 A1 Sep. 6, 2007

(30) Foreign Application Priority Data

Feb. 8, 2006 (JP) .............................. 2006-031489
Jan. 19, 2007 (JP) .............................. 2007-009821

(51) Int. Cl.
*G03B 23/02* (2006.01)

(52) U.S. Cl. ................. 242/343.2; 242/338.1; 242/348; 360/132

(58) Field of Classification Search ................. 242/338, 242/338.1, 343, 343.1, 343.2, 345, 345.2, 242/348, 611, 611.1; 360/85, 93, 132
See application file for complete search history.

(56) References Cited

U.S. PATENT DOCUMENTS 4,033,523 A * 7/1977 Roman ..................... 242/338.1
7,350,731 B2 * 4/2008 Hiraguchi ................. 242/338.1
7,410,112 B2 * 8/2008 Inugai ...................... 242/338.1
7,481,389 B2 * 1/2009 Hoge ....................... 242/338.1

FOREIGN PATENT DOCUMENTS

JP          9-95381 A        4/1997

* cited by examiner

*Primary Examiner*—William A Rivera
(74) *Attorney, Agent, or Firm*—Birch, Stewart, Kolasch & Birch, LLP

(57) ABSTRACT

A tape cartridge includes a case having a first through-hole and a second through-hole in the bottom of a first container, a reel disposed within the case and having a cylindrical hub portion with a bottom, a tape wound around the hub portion such that the tape can be fed out, and a reel lock mechanism that allows the reel to be immovably supported. The reel lock mechanism includes an interposing member that can move vertically in the thickness direction of the case, and a support member. The support member includes a first pedestal portion that, in a state in which the reel has been put in contact with the second container and the interposing member has been put in contact with the reel, is positioned immediately below the interposing member and thus immovably supports the interposing member; and an operating portion that is disposed in the first through-hole and allows, with a predetermined operation, support of the interposing member and release of support of the interposing member.

15 Claims, 18 Drawing Sheets

TAPE CARTRIDGE AND RECORDING/REPRODUCING APPARATUS

BACKGROUND OF THE INVENTION

1. Field of the Invention

The present invention relates to a tape cartridge in which a tape-like recording medium is housed in a case, and a recording/reproducing apparatus for recording/reproducing information with respect to the tape cartridge.

2. Description of Related Art

A conventional tape cartridge is provided with a reel around which tape is wound inside the tape cartridge. When the tape cartridge is loaded to a drive (recording/reproducing apparatus), a reel gear formed in the reel is engaged to a driving gear of a drive shaft of the drive, and the reel is raised a prescribed amount and thus moved to a position along the drive system. Accordingly, the reel is housed in a case in a state such that the reel can rotate and can move vertically.

In such conventional tape cartridges, in order to reduce the damage caused to the tape due to being dropped or the like, configurations have been adopted such as (1) forming the case in which the reel is housed using impact-resistant material, (2) making the housing case for housing the tape cartridge elastically deformable, or (3) providing a convex portion inside the housing case that prevents positional displacement in the radial direction of the reel (for example, see JP H9-95381A).

One reason for damage to the tape is wobbling of the reel. As stated above, the reel is housed in the case such that the reel can rotate and can move vertically, and is often supported by the force of a spring. Accordingly, when an impact due to being dropped or the like is applied, the reel wobbles much inside the case and collides with the inner wall of the case or the like, for example, and the reel may deform or the like, causing tape crimps or the like.

The present invention provides a tape cartridge in which wobbling of the reel when the tape cartridge is not loaded in a drive is prevented, and in which an impact applied to the reel is mitigated, and also provides a recording/reproducing apparatus that can record information to tape of the tape cartridge and can reproduce information recorded to the tape.

SUMMARY OF THE INVENTION

The tape cartridge of the present invention includes a case formed with a first container and a second container fitted together so as to form an internal space, the case having a first through-hole and a second through-hole in the bottom of the first container; a reel disposed within the case and having a cylindrical hub portion with a bottom; a tape wound around the hub portion such that the tape can be fed out; and a reel lock mechanism that allows the reel to be immovably supported; wherein the reel lock mechanism includes an interposing member that can move vertically in the thickness direction of the case, and a support member; and the support member includes a first pedestal portion that, in a state in which the reel has been put in contact with the second container and the interposing member has been put in contact with the reel, is positioned immediately below the interposing member and thus immovably supports the interposing member; and an operating portion that is disposed in the first through-hole and allows, with a predetermined operation, support of the interposing member and release of support of the interposing member.

A recording/reproducing apparatus for recording to or reproducing information from an example of the tape cartridge of the present invention, the recording/reproducing apparatus including a receiving portion that allows the tape cartridge to be housed; a drive shaft having a drive gear that can engage with the reel; a drive reel that can reel in tape supplied from the tape cartridge; a magnetic head for recording information to the tape and reproducing information recorded to the tape; a lock release mechanism that allows releasing of a locked state in which the first pedestal portion is positioned immediately below the interposing member so that the support member immovably supports the interposing member; a relocking mechanism that returns the lock release state to the locked state; and a control portion that controls operations of the receiving portion, the drive shaft, the drive reel, the magnetic head, the lock release mechanism, and the relocking mechanism.

DETAILED DESCRIPTION OF THE INVENTION

Figure 1:
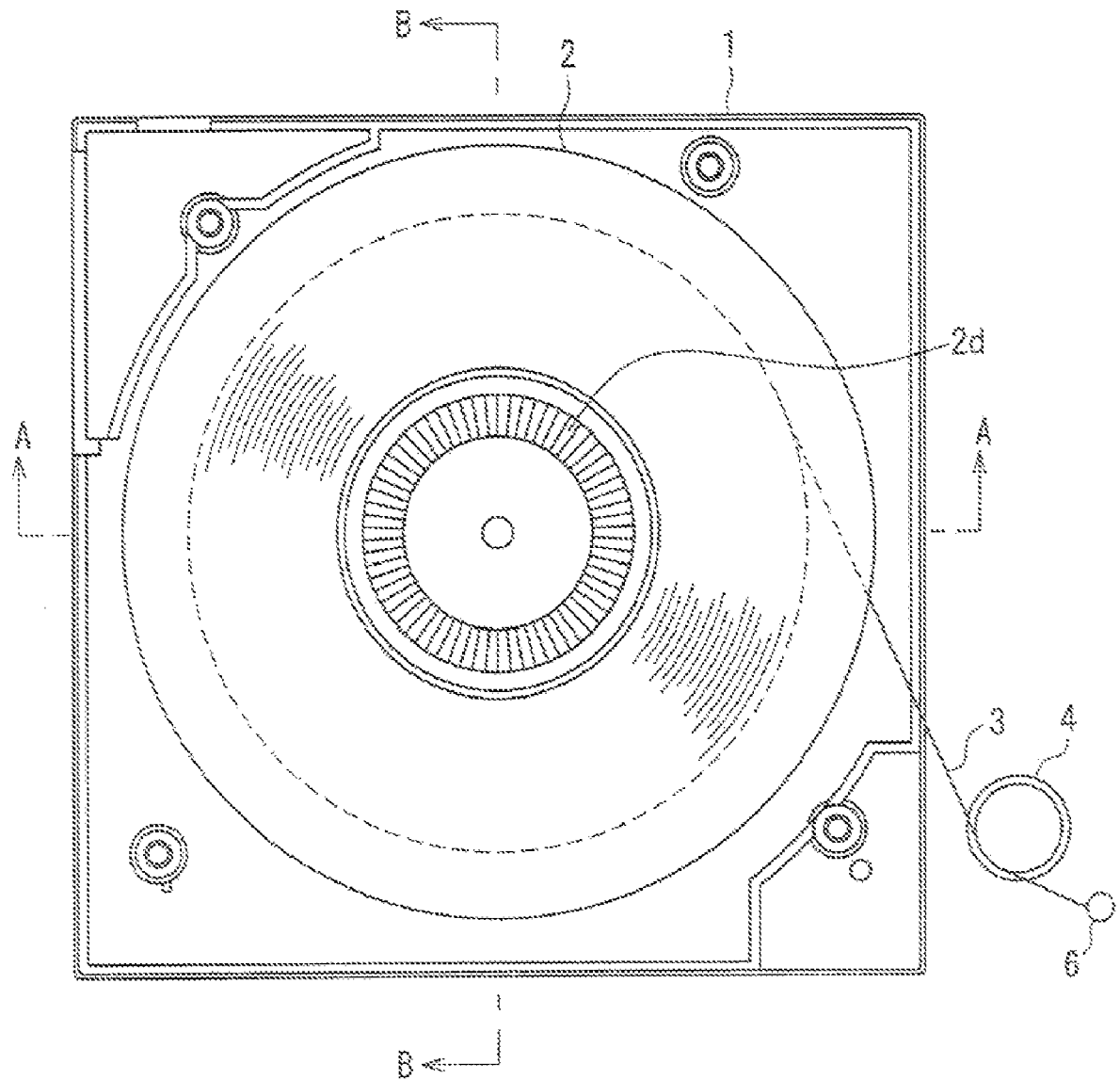
FIG. 1 is a conceptual plan view that illustrates the internal structure of an example of a tape cartridge of an embodiment of the invention.

In an example of the tape cartridge of the present invention, an interposing member is disposed in a cavity of a hub portion such that the interposing member can move vertically. When, in a state with a reel in contact with a second container and the interposing member in contact with the reel, an operating portion of a support member disposed in a first through-hole is, for example, slidably operated in a predetermined direction so that a first pedestal portion of the support member is positioned immediately below the interposing member, the interposing member can be immovably supported by the first pedestal portion, and when the operating portion is slidably operated in the direction opposite to the predetermined direction, it is possible to release support of the interposing member by the first pedestal portion. In the present specification, the state in which the interposing member is immovably supported by the first pedestal portion is referred to as a "locked state" and the state in which support of the interposing member by the first pedestal portion has been released is referred to as a "released state".

A state in which the reel is in contact with the second container and the interposing member is in contact with the reel, i.e. the locked state, is obtained by, for example, inserting a rod-like member such as a pin from a second through-hole of the first container, pressing the interposing member to the side of the second container with the rod-like member, and further positioning the first pedestal portion immediately below the interposing member. This locked state, for example, is obtained by operation of a user himself, or, as described below, by using an example of the recording/reproducing apparatus of the present invention. Thus, in an example of the tape cartridge of the present invention, it is possible to prevent wobbling of the reel by the user himself when the user desires, and thus impact force applied to the reel can be mitigated.

In an example of the tape cartridge of the present invention, the support member includes two or more movable pieces whose distance from each other can be changed. The number of movable pieces is not particularly limited, but for example, two is a suitable number. In this case, it is preferable to provide an operating portion for each movable piece.

In an example of the tape cartridge of the present invention, it is preferable that the support member is further provided with an elastic member that biases the two or more movable pieces to move near each other. When the support member is provided with an elastic member, the operation to move the movable pieces near each other can be performed by the biasing force of the elastic member. When the support member is not provided with an elastic member, for example, the operating portion of each movable piece may be operated by a user, or may be operated by an example relocking mechanism of the recording/reproducing apparatus described below.

In an example of the tape cartridge of the present invention, it is preferable that the material of the interposing member includes an impact-absorbing material. When the material of the interposing member includes an impact-absorbing material, external force can be absorbed by the interposing member, and thus it is possible to effectively suppress wobbling, positional displacement or the like of the reel. An example of impact-absorbing material given here is rubber-like elastic material, and 60-90 Hs is suitable for the hardness of the rubber-like elastic material. Here, that hardness is a value measured with a durometer (a spring-type rubber hardness measuring device).

In an example of the tape cartridge of the present invention, it is preferable that the interposing member is disposed in approximately the center in the cavity in the hub portion. When the interposing member is disposed in approximately the center in the cavity in the hub portion, it is possible to effectively suppress wobbling, positional displacement or the like of the reel for external force from any direction. Also, in this case, it is still more preferable that the interposing member includes impact-absorbing material. When the interposing member includes impact-absorbing material, it is possible to uniformly absorb and mitigate external force from any direction.

In an example of the tape cartridge of the present invention, the tape cartridge includes a shaft member disposed in the cavity of the hub portion in contact with the reel, and a first spring-like elastic body, and the reel is biased to press against the second container by the elastic repulsive force of the first spring-like elastic body that acts via the shaft member.

In an example of the tape cartridge of the present invention, it is preferable that the tape cartridge further includes a second spring-like elastic body, one end of the second spring-like elastic body contacting the shaft member and the other end of the second spring-like elastic body contacting the interposing member. When the tape cartridge is provided with such a second spring-like elastic body, the interposing body is always biased to the side of the first container by the second spring-like elastic body. Thus, when support of the interposing member by the first pedestal portion has been released, the interposing member smoothly moves to the side of the first container, so such a configuration is preferable.

In an example of the tape cartridge of the present invention, it is preferable that the first container includes an interposing member guide member provided erected in the thickness direction of the case from a bottom portion of the first container, the interposing member guide member guiding vertical movement of the interposing member. The interposing member guide member, for example, is inserted into a through-hole formed in the interposing member, and while guiding vertical movement of the interposing member, prevents sideways movement, rotation, or the like of the interposing member.

An example of the recording/reproducing apparatus of the present invention, which allows an example of the tape cartridge of the present invention to record/reproduce information, is provided with a lock release mechanism. The lock release mechanism, for example, includes a lock release arm that makes it possible to release support of the interposing member by the first pedestal portion, by slidably operating the operating portion of the tape cartridge.

Also, an example of the recording/reproducing apparatus of the present invention, which allows an example of the tape cartridge of the present invention to record/reproduce information, is provided with a relocking mechanism. The relocking mechanism, for example, includes a pressing member that can be inserted into the case of the tape cartridge through the second through-hole formed in the bottom of the first container that configures the case of the tape cartridge, and can press against the interposing member until the interposing member makes contact with the reel, which is in contact with the second container.

EMBODIMENT 1

Following is a description of an example of the tape cartridge of an embodiment of the present invention, with reference to FIGS. 1 to 13B.

Figure 2A:
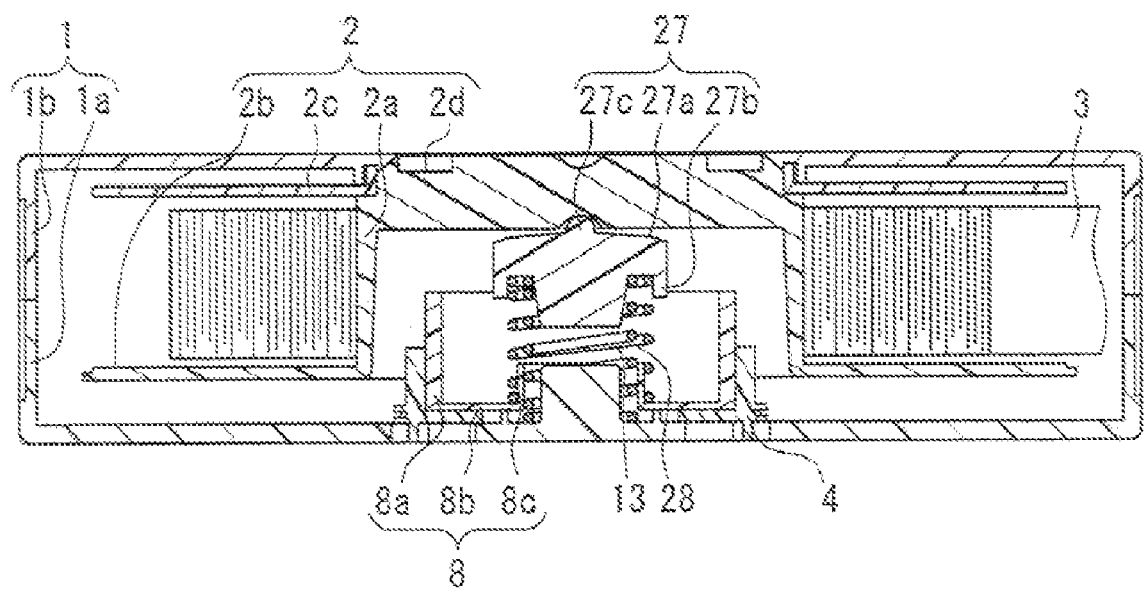
FIG. 2A is an enlarges cross-sectional view of the tape cartridge shown in FIG. 1 taken along line A-A.
Figure 2B:
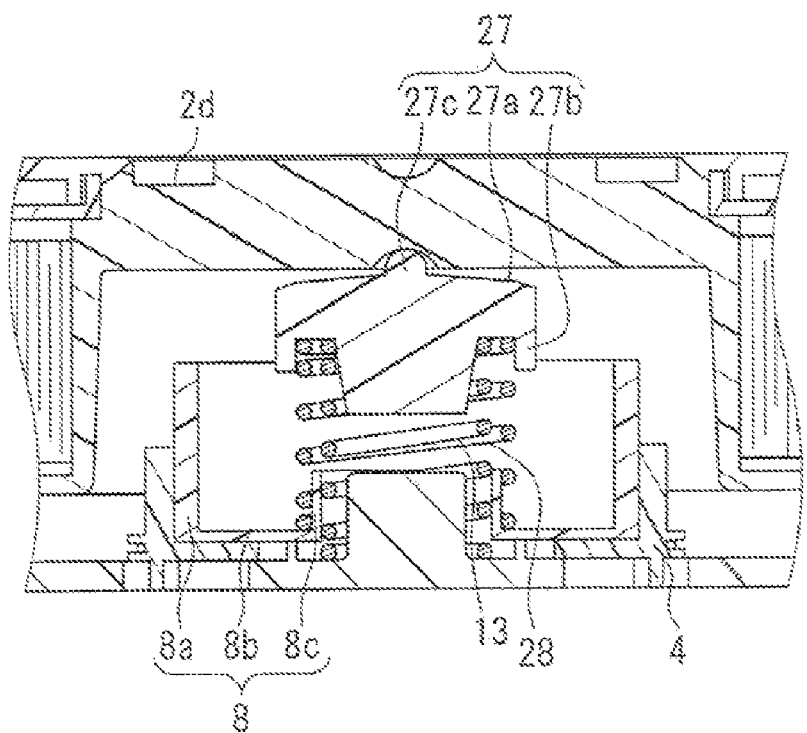
FIG. 2B is a partial enlarged view of FIG. 2A.
Figure 3A:
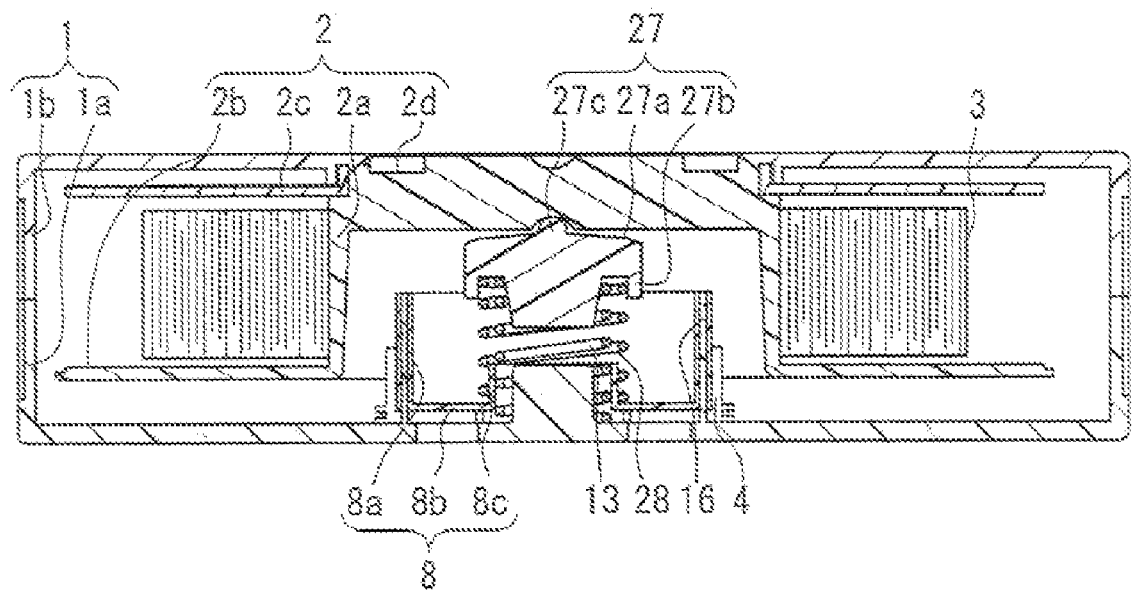
FIG. 3A is an enlarged cross-sectional view of the tape cartridge shown in FIG. 1 taken along line B-B.
Figure 3B:
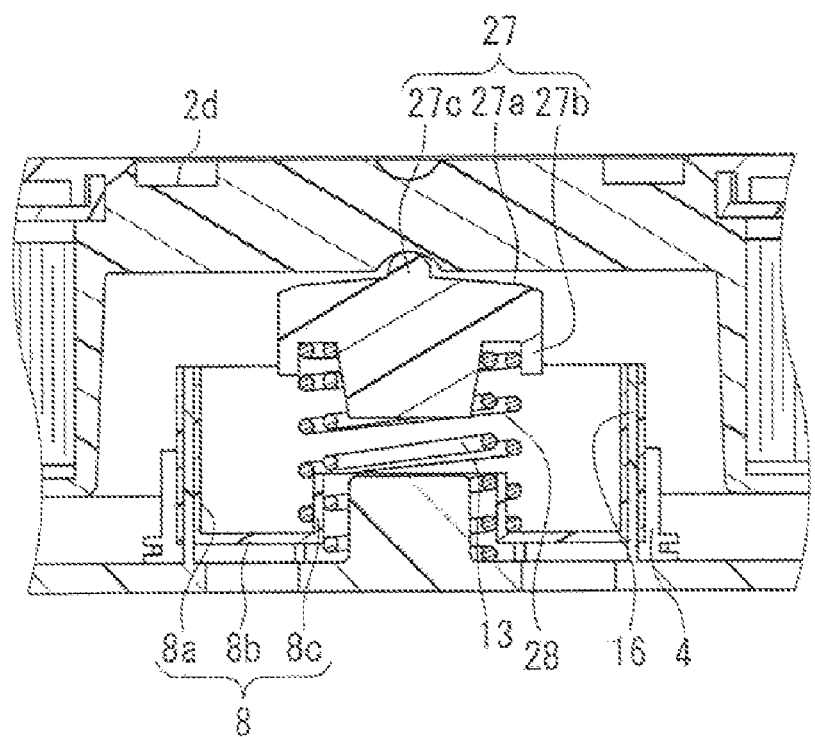
FIG. 3B is a partial enlarged view of FIG. 3A.
Figure 4:
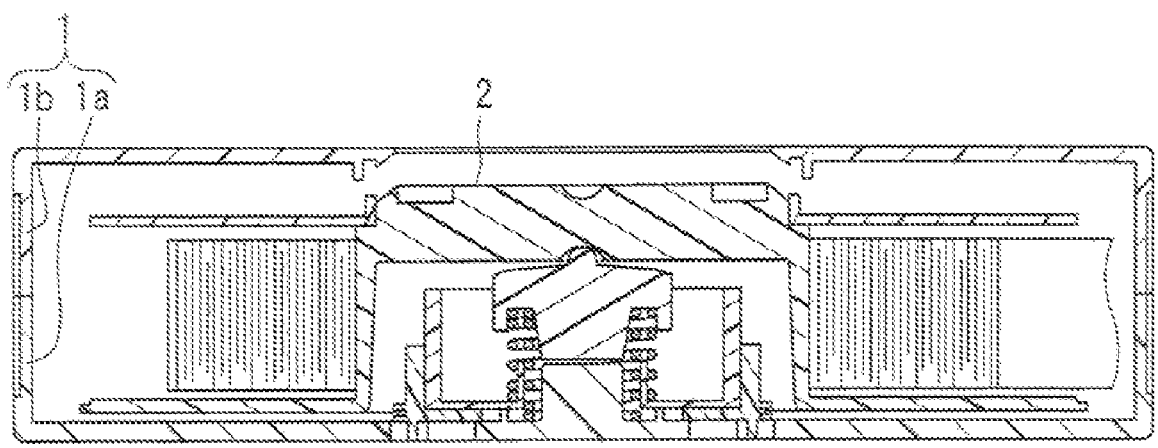
FIG. 4 is a cross-sectional view showing a state in which, in the pate cartridge shown in FIG. 2A, a reel has maximally approached a first container side.

FIG. 1 is a conceptual plan view that illustrates the internal structure of an example of a tape cartridge of this embodiment. FIG. 2A is an enlarged cross-sectional view of the tape cartridge shown in FIG. 1 taken along line A-A. FIG. 2B is a partial enlarged view of FIG. 2A. FIG. 3A is an enlarged cross-sectional view of the tape cartridge shown in FIG. 1 taken along ling B-B. FIG. 3B is a partial enlarged view of FIG. 3A. FIG. 4 is an enlarged cross-sectional view of the tape cartridge shown in FIG. 1 taken along line A-A, and is a cross-sectional view showing a state in which the reel has maximally approached a first container side.

For the sake of convenience of description, the second container 1b shown in FIGS. 2A to 4 is omitted from FIG. 1. Also, a first container 1a is disposed below a second container 1b in FIGS. 2A, 3A, and 4, but in ordinary use the first container 1a is disposed above the second container 1b.

As shown in FIG. 1, the tape cartridge of the present invention is provided with a case 1 and a magnetic tape 3 (below, also referred to as simple the "tape 3") housed in the case 1. The tape is wound around a reel 2 rotatably housed in the case 1. The tape 3 wound around the reel 2 can be fed out from the reel 2 and drawn outside the case 1. A metal leader 6 is fixed to the fed-out end of the tape 3, and when the tape cartridge is loaded in a drive, the leader 6 is grasped by a coupler of the drive. In FIG. 1, numeral 4 indicates a guide roller of a drive system of the drive.

As shown in FIGS. 2A and 3A, in the case 1, the first container 1a and the second container 1b are formed fitted together so as to form an internal space, and the first container 1a and the second container 1b are, for example, fastened together by screws or the like. The case 1 is provided with an opening portion (not shown) for drawing the tape 3 out of the case 1, and a door (not shown) that opens/closes the opening portion.

As shown in FIGS. 2A and 3B, the reel 2 includes a hub portion 2a around which the tape 3 is wound, and a pair of disk-like flanges 2b and 2c that are integrated with the hub portion 2a. The flanges 2b and 2c are extended from each end of the hub portion 2a in the direction perpendicular to the height-wise direction. The hub portion 2a is formed in approximately the shape of a cylinder having a bottom, with a cavity inside. In the cavity, a shaft member 27 and a compression coil spring (a first spring-like elastic body 13) are disposed. One end of the first spring-like elastic body 13 contacts the shaft member 27, and the other end contacts the inner face of the bottom of the first container 1a. Thus, in the case 1, the reel 2 is pressed and biased upward (the side of the second container 1b) in FIG. 2 by the first spring-like elastic body 13, which acts via the shaft member 27. Thus, the reel 2 is prevented from freely rotating when not in use.

Also the tape cartridge of the present embodiment may be, for example, further provided with a free rotation prevention mechanism as described below in addition to the free rotation prevention mechanism of the reel 2 described above.

(1) a free rotation prevention mechanism configured from a gear formed at the edge of the flange 2c, and a stopper (not shown) disposed in and fixed to the case such that the stopper can engage with the gear (2) a free rotation prevention mechanism configured from a gear formed in the bottom of the second container 1b, and a gear formed in a portion that contacts the opening of the hub portion 2a, the latter gear being engageable with the former gear The shaft member 27 includes a flat face facing the inner face of the bottom of the first container 1a, and a seat plate 27a that receives one end of the first spring-like elastic body 13. The seat plate 27a also receives one end of a second spring-like elastic body 28. The outer shape of the seat plate 27a is round, and at the peripheral edge of the seat plate 27a, a ring-like wall 27b is provided protruding to the side of the first container 1b. The shaft member 27 is provided with a protrusion 27c, and the protrusion 27c is rotatably fitted in a concave portion provided in the inner face of the bottom of the hub portion 2a. Accordingly, the reel 2 can be rotated around the shaft member 27.

Figure 5:
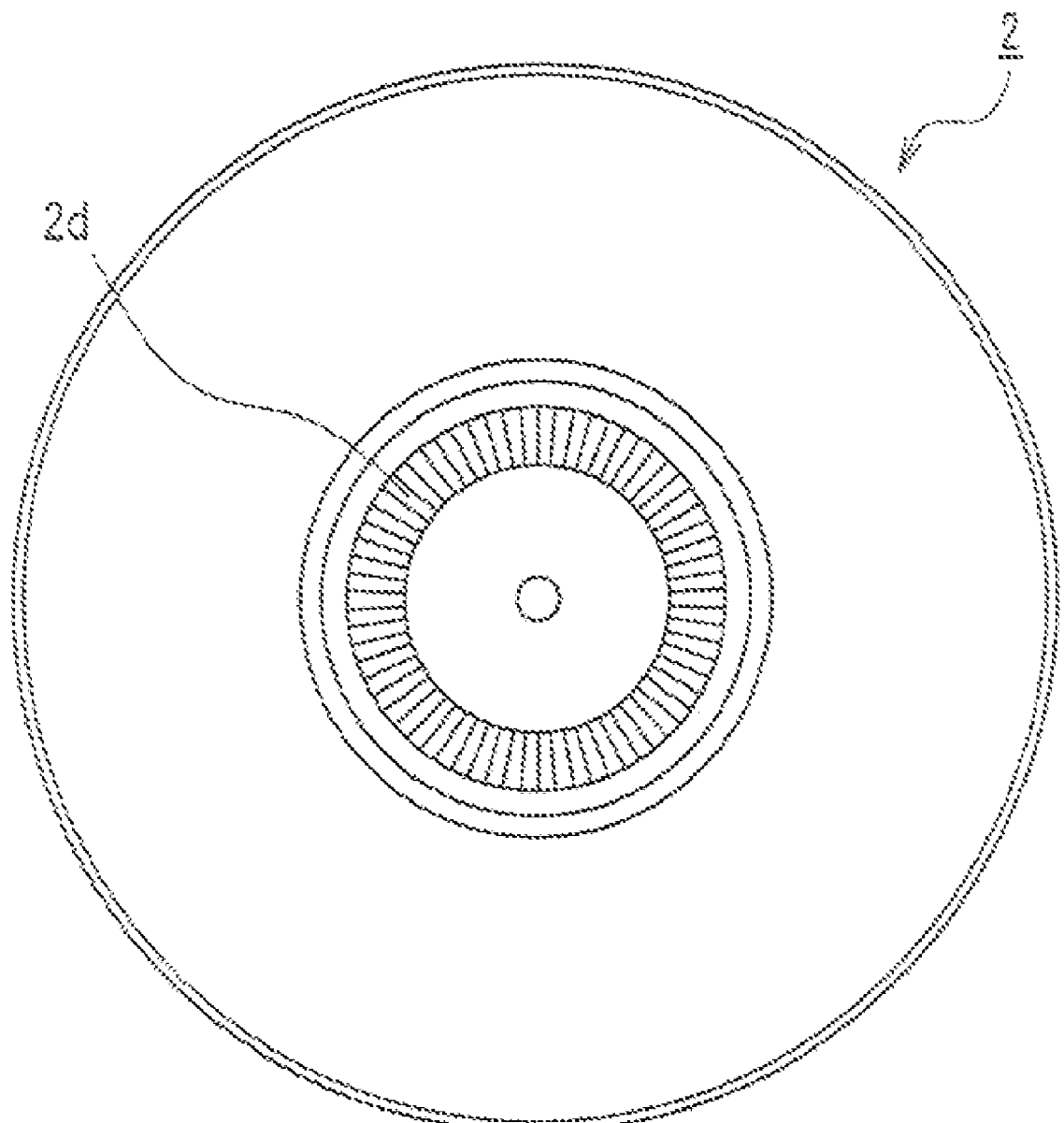
FIG. 5 is a plan view of the reel used to configure an example tape cartridge of this embodiment.

Also, in the reel 2, an engaging gear 2d that can be engaged with a driving gear of a drive shaft (not shown) of the drive is provided on the outer surface of the bottom of the hub portion 2a (see FIG. 5). As shown in FIGS. 2A to 3B, an opening is formed in the bottom of the second container 1b. In a state with the engaging gear 2d engaged with the driving gear of the drive shaft of the drive inserted into the case 1 from the opening, the reel 2 rotates. When the reel 2 rotates, the tape 3 is wound around the reel 2, or fed out from the reel 2.

As shown in FIGS. 2A to 3B, in the cavity of the hub portion 2a, in addition to the shaft member 27 and the first spring-like elastic body 13, an interposing member 8 and the second spring-like body 28 are disposed. The interposing member 8 is formed in approximately the shape of a cylinder having a bottom, with an opening 8e (see FIG. 6D) in the center of the bottom. At the perimeter of this opening, a ring-like protruding piece 8c is provided that protrudes to the inside of the interposing member 8. The inner diameter of the second spring-like elastic body 28 is larger than the outer diameter of the first spring-like elastic body 13, the inner diameter of the opening 8e of the interposing member 8 is larger than the outer diameter of the first spring-like elastic body 13, and the outer diameter of the ring-like protruding piece 8c is smaller than the inner diameter of the second spring-like elastic body 28. The inner diameter of a cylindrical portion 8a of the interposing member 8 is larger than the outer diameter of the second spring-like elastic body 28. Thus, the first spring-like elastic body 13, the ring-like protruding piece 8c of the interposing member 8, the second spring-like elastic body 28, and the cylindrical portion 8a of the interposing portion 8 are disposed concentric to each other, in that order.

Also, the inner diameter of the cylindrical portion 8a of the interposing member 8 is larger than the outer diameter of the seat plate 27a of the shaft member 27. The opening 8e, in a bottom portion 8b of the interposing member 8, has a diameter that is larger than the outer diameter of the first spring-like elastic body 13, and has a diameter that is smaller than the inner diameter of the second spring-like elastic body 28 (see FIG. 6D and the like). Thus, the first spring-like elastic body 13 is inserted through the opening 8e of the interposing member 8, so that the end of the first spring-like elastic body 13 contacts the bottom of the first container 1a. One end of the second spring-like elastic body 28 contacts the seat plate 27a of the shaft member 27, and the other end contacts the bottom portion 8b of the interposing member 8, and the second spring-like elastic body 28 is disposed between the shaft member 27 and the bottom portion 8b of the interposing member 8, thus pressing and biasing the interposing member 8 to the side of the first container 1a of the case 1. A support member 4 described below is disposed between the interposing member 8 and the first container 1a, and in FIGS. 2A to 4, the interposing member 8 is in contact with the support member 4.

As shown in FIGS. 2A to 3B, the reel 2 is ordinarily pushed against the opening of the second container 1b. However, because the reel 2 is pushed against the second container 1b by biasing force of the first spring-like elastic body 13 and the second spring-like elastic body 28 via the shaft member 27, if force opposing the biasing force is applied to the reel 2, it is possible to push down the reel 2 to the side of the first container 1a, as shown in FIG. 4.

Figure 6A:
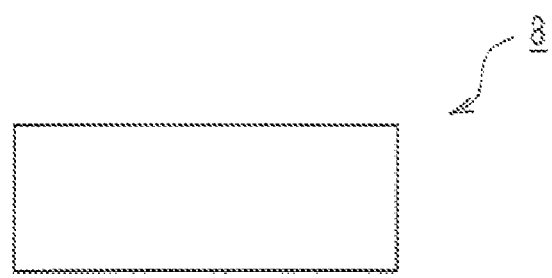
FIG. 6A is a front view of an example of an interposing member used to configure the tape cartridge of this embodiment.
Figure 6B:
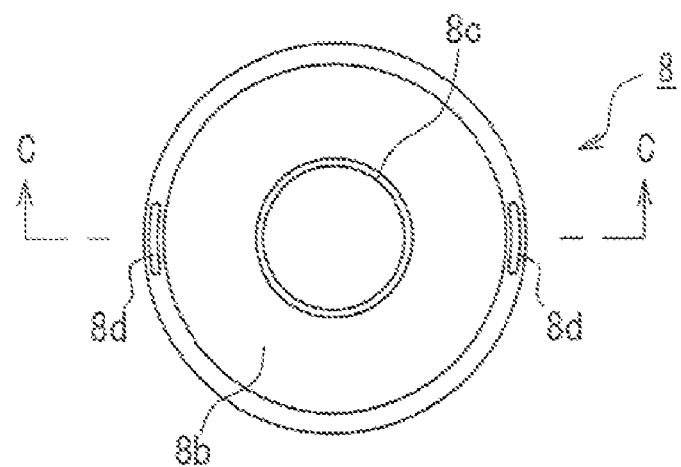
FIG. 6B is a plan view of the interposing member shown in FIG. 6A.
Figure 6C:
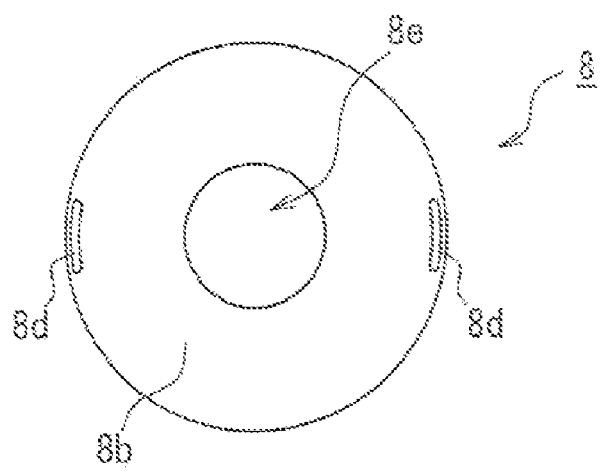
FIG. 6C is a bottom view of the interposing member shown in FIG. 6A.
Figure 6D:
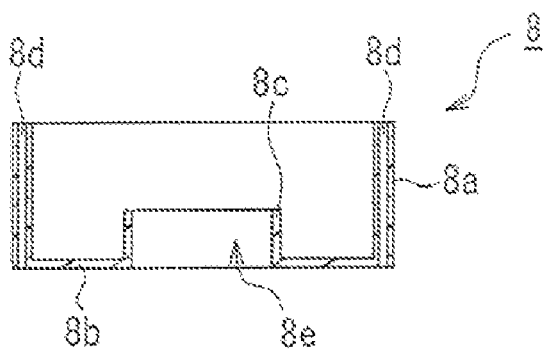
FIG. 6D is a cross-sectional view of the interposing member shown in FIG. 6B taken along line C-C.

Next is a detailed description of the interposing member 8 with reference to FIGS. 6A to 6D. FIG. 6A is a front view of an example of an interposing member used to configure the tape cartridge of this embodiment. FIG. 6B is a plan view of the interposing member shown in FIG. 6A, FIG. 6C is a bottom view of the interposing member shown in FIG. 6A, and FIG. 6D is a cross-sectional view of the interposing member shown in FIG. 6B taken along line C-C.

As shown in FIGS. 6A to 6D, at the perimeter of the opening 8e provided in the bottom portion 8b of the interposing member 8, the ring-like protruding piece 8c is provided protruding to the inside of the interposing member 8. The inner diameter of the second spring-like elastic body 28 (see FIGS. 2B and 3B) is larger than the outer diameter of the ring-like protruding piece 8c. Accordingly, by inserting the ring-like protruding piece 8c inside the second spring-like elastic body 28, positional displacement of the second spring-like elastic body 28 is suppressed. A pair of through-holes 8d are formed in the interposing member 8, and each through-hole 8d passes through a wall constituting the cylindrical portion 8a of the interposing member 8 in the heightwise direction of the cylindrical portion 8a, i.e. in the thickness direction of the case 1 (see FIG. 3B and the like). An interposing member guide member 16 described below (see FIG. 3B) is inserted in the through-holes 8d. Thus, according to extension or contraction of the first spring-like elastic body 13 and the second spring-like elastic body 28, the interposing member 8 moves vertically while being guided by the interposing member guide member 16. Also, the interposing member guide member 16 prevents rotation and positional displacement of the interposing member 8, as well as wobbling in the radial direction or the like.

Figure 7A:
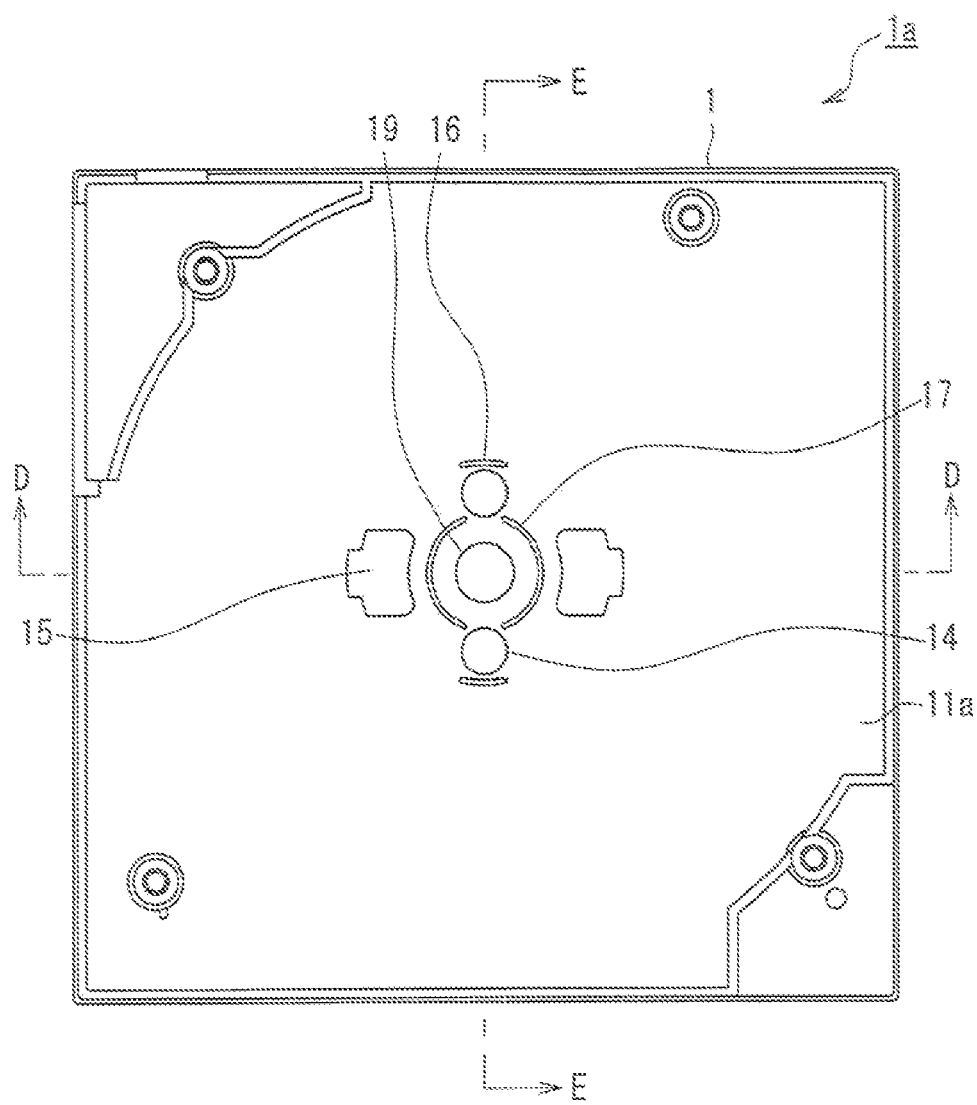
FIG. 7A is a plan view of an example of the first container used to configure a case for the tape cartridge of this embodiment.
Figure 7B:
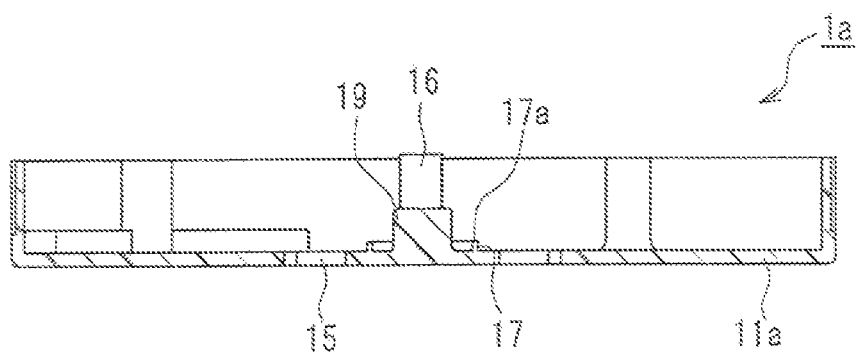
FIG. 7B is a cross-sectional view of FIG. 7A taken along line D-D.
Figure 7C:
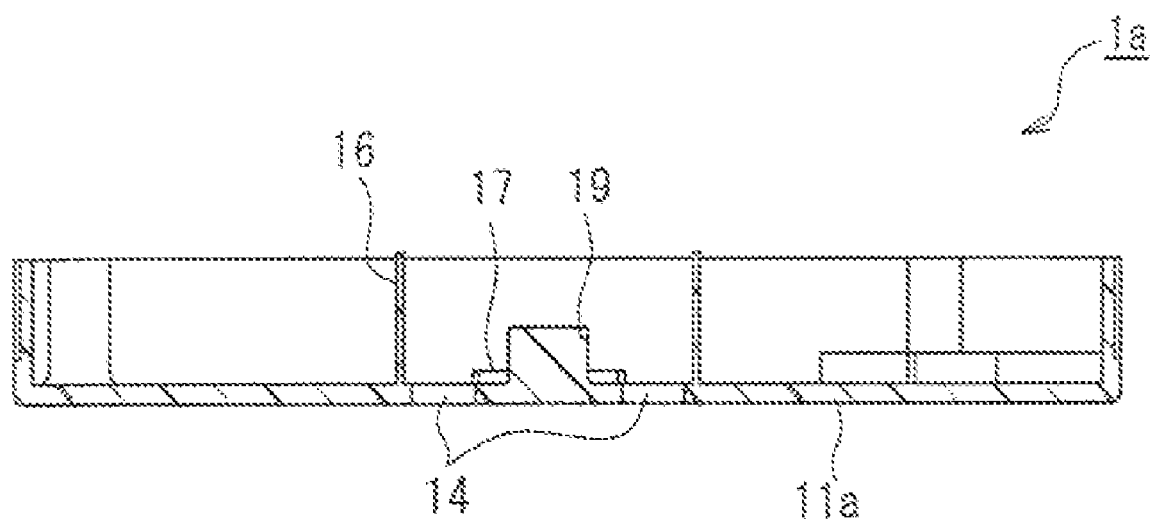
FIG. 7C is a cross-sectional view of FIG. 7A taken along line E-E.

Next is a detailed description of the first container 1a (see FIG. 2A) of the case 1 with reference to FIGS. 7A to 7C. FIG. 7A is a plan view of the first container 1a used to configure the tape cartridge of this embodiment. FIG. 7B is a cross-sectional view of the first container 1a shown in FIG. 7A taken along line D-D, and FIG. 7C is a cross-sectional view of the first container 1a shown in FIG. 7A taken along line E-E.

As shown in FIGS. 7A to 7C, a guide protrusion 19 is provided in approximately the middle of the bottom of the first container 1a used to configure the case, and the guide protrusion 19 has an outer diameter that is less than the inner diameter of the first spring-like elastic body 13 (see FIG. 2B). Positional displacement of the first spring-like elastic body 13 is suppressed by inserting the guide protrusion 19 into the first spring-like elastic body 13 (see FIG. 2B).

In the vicinity of the guide protrusion 19, a first through-hole 15 and a second through-hole 14 are formed. The first through-hole 15 is provided in order to expose an operating portion 41c (see FIG. 9D) of the support member 4, which allows the support member 4 to be operable from outside the case, outside of the case. The second through-hole 14 is provided in order to insert into the case a rod-like pin 21 (see FIG. 10A and the like) described below or a pressing member 66a (see FIG. 16) used to configure the recording/reproducing apparatus.

The second through-hole 14 is formed immediately below the bottom portion 8b of the interposing member 8. In the example shown in FIG. 7A, a pair of the second through-holes 14 are formed symmetrically centered at the guide protrusion 19, and the second through-holes 14 are formed between the guide protrusion 19 and the respective interposing member guide members 16. That is, the pair of the interposing member guide members 16, the pair of the second through-holes 14, and the guide protrusion 19 are formed on a predetermined straight line that passes through approximately the center of the inner face of the bottom portion 11a of the first container 1a.

Also, in the vicinity of the guide protrusion 19 of the inner face of a bottom portion 11a of the first container 1a, a pair of control ribs 17 are formed that limit the range of movement of movable pieces 41 (see FIGS. 9A to 9D) used to configure the support member 4 (see FIG. 2B). The pair of control ribs 17 are, for example, arranged axisymmetric to the aforementioned predetermined straight line. The first through-holes 15 are formed so that a control rib 17 is formed between the guide protrusion 19 and each first through-hole 15. The first through-holes 15 also have the role of limiting the range of movement of the movable pieces 41 (see FIG. 9A).

Figure 8A:
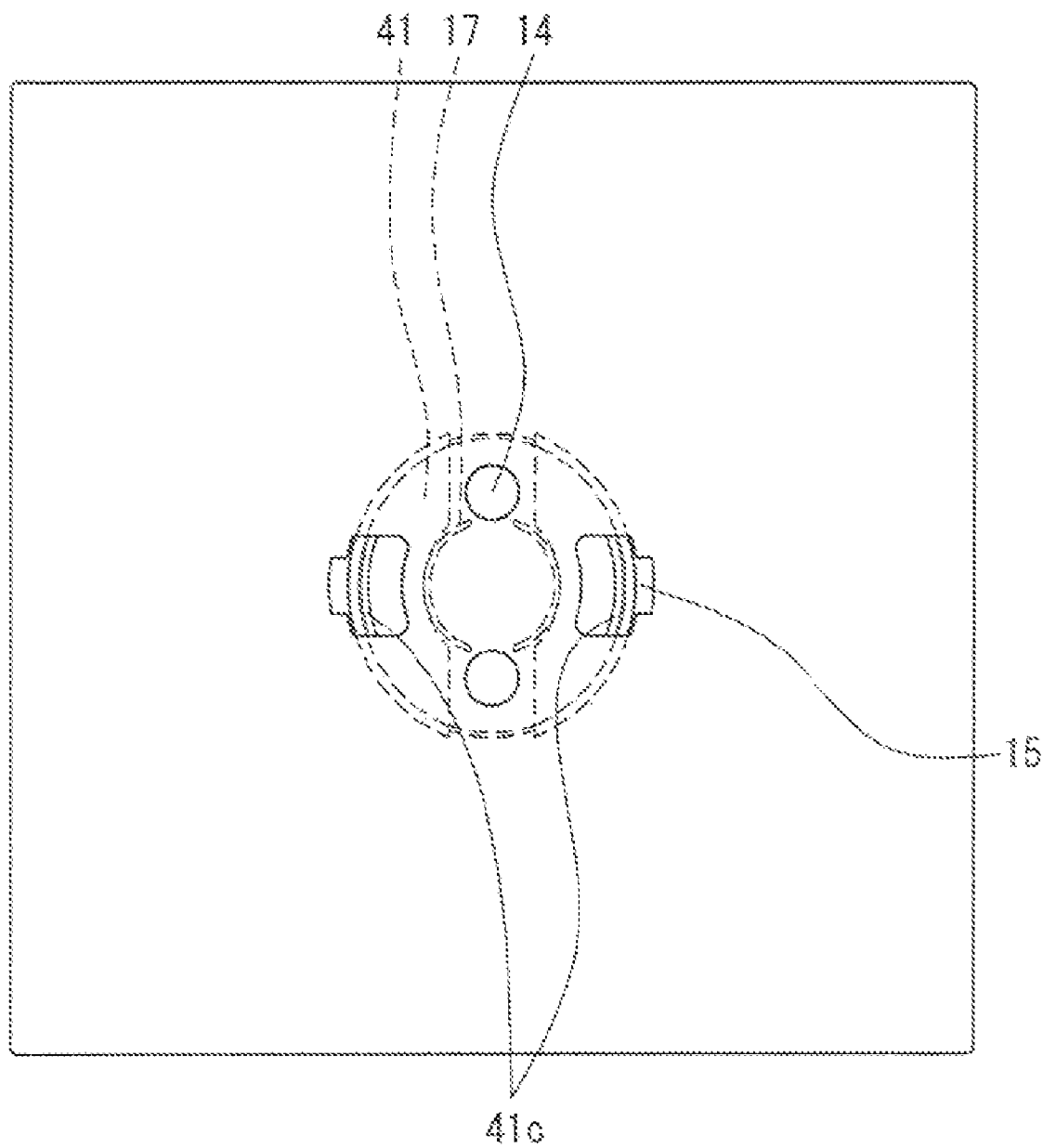
FIG. 8A is a rear view of an example of the tape cartridge of this embodiment.
Figure 8B:
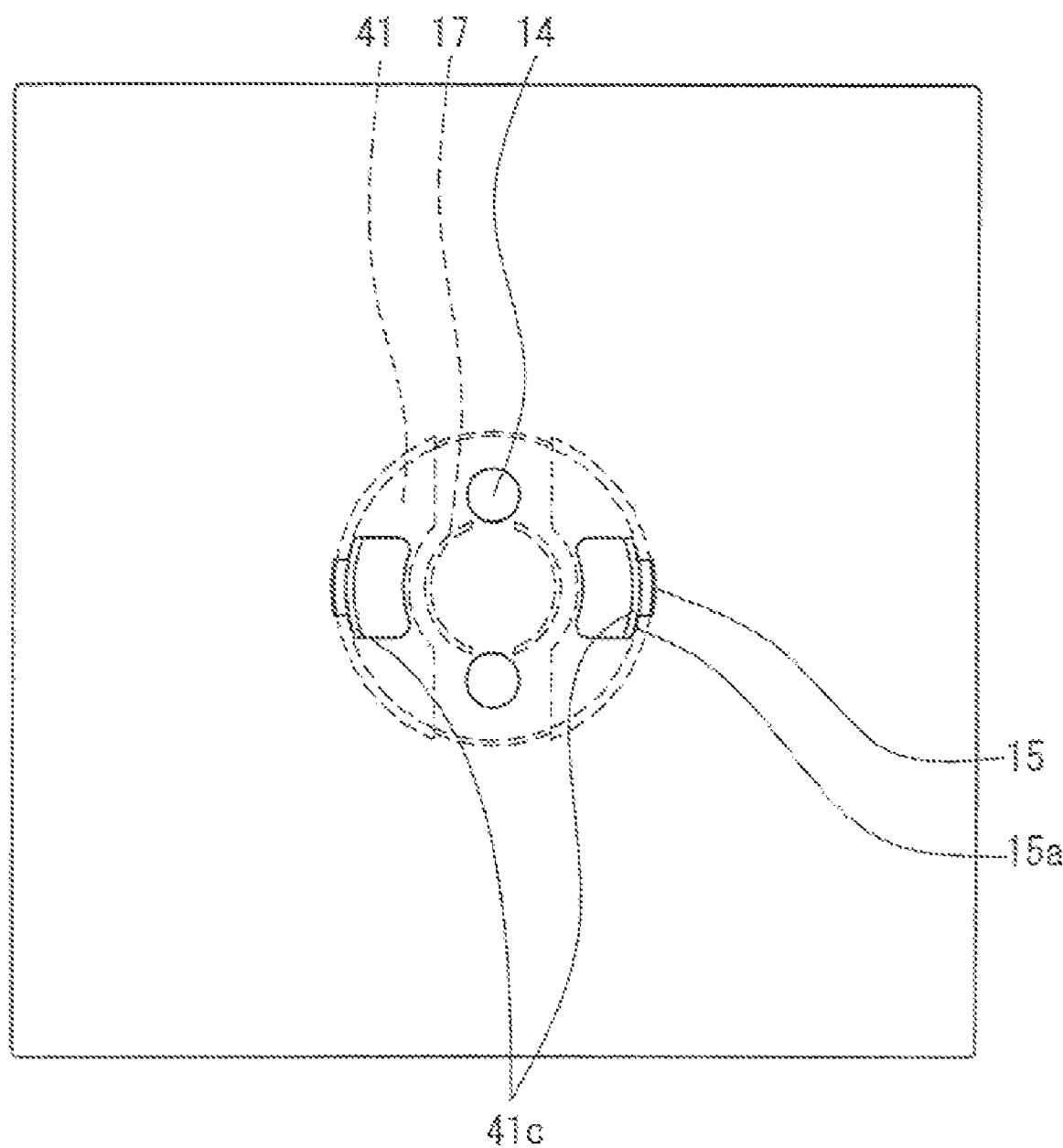
FIG. 8B is a rear view of an example of the tape cartridge of this embodiment.

FIG. 8A shows a rear view of the tape cartridge of this embodiment when the pair of movable pieces 41 (see FIGS. 9A to 9D) are moved closest to each other, and FIG. 8B shows a rear view of the tape cartridge of this embodiment when the pair of movable pieces 41 (see FIGS. 9A to 9D) are moved farthest from each other.

In the state shown in FIG. 8A, part of each movable piece 41 is in contact with the corresponding control rib 17, but an operating portion 41c of the movable piece 41 does not make contact in a portion of a wall face constituting the first through-hole 15 that is near the control rib 17. Also, as shown in FIG. 8B, the hole width of the first through-hole 15 in a portion separated from the control rib 17 is less than in a portion near the control rib 17. Thus, the wall face that constitutes the first through-hole 15 is provided with a contact face 15a, with which only part of the outer face of an operating portion 41c is allowed to make contact. Therefore, in the state shown in FIG. 8B, a portion of the outside face of the operating portion 41c of the movable piece 41 does not make contact with the wall face constituting the first through-hole 15. In this manner, it is preferable that the first through-hole 15 is provided with the contact face 15a, and that the length of the first through-hole 15 in the same direction as the direction in which the movable piece 41 slides is longer than the length that the movable piece 41 slides, because the user can easily operate the operating portion 41c.

The height of the pair of control ribs 17 is not particularly limited as long as it is possible for the control ribs 17 to limit sliding of the movable pieces 41. In the example shown in FIGS. 7A to 7C, the height of each control ribs 17 is set such that an end face 17a (see FIG. 7B) of each control rib 17, and the face of the side of the interposing member 8 side of a second pedestal portion 41b (see FIG. 9D) of the support member 4 described below, are included in the same plane. With this sort of shape, tilting of the interposing member 8 is suppressed due to the interposing member 8 being supported also by the control ribs 17 (see FIG. 2B).

Figure 9A:
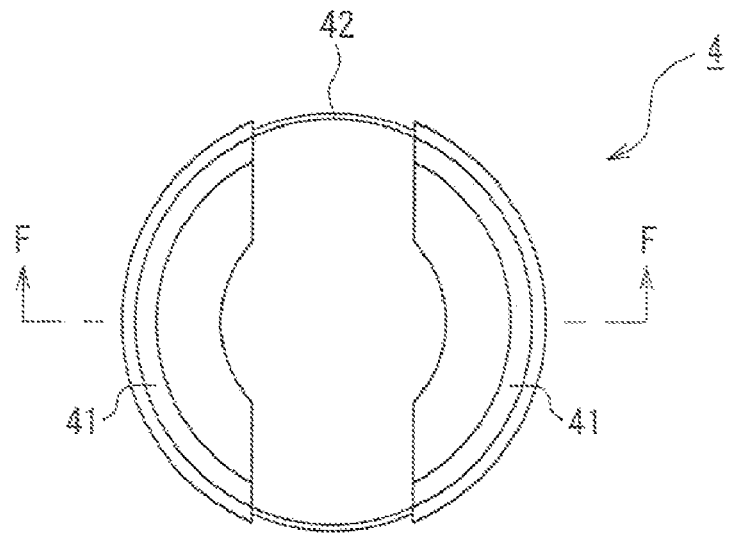
FIG. 9A is a plan view of an example of a support member used to configure the tape cartridge of this embodiment.
Figure 9B:
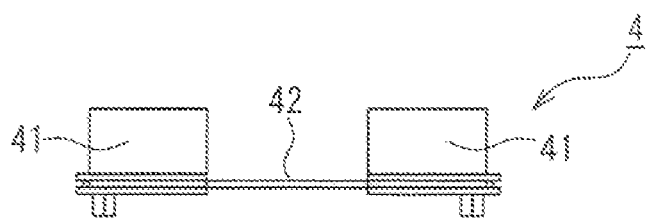
FIG. 9B is a front view of the support member shown in FIG. 9A.
Figure 9C:
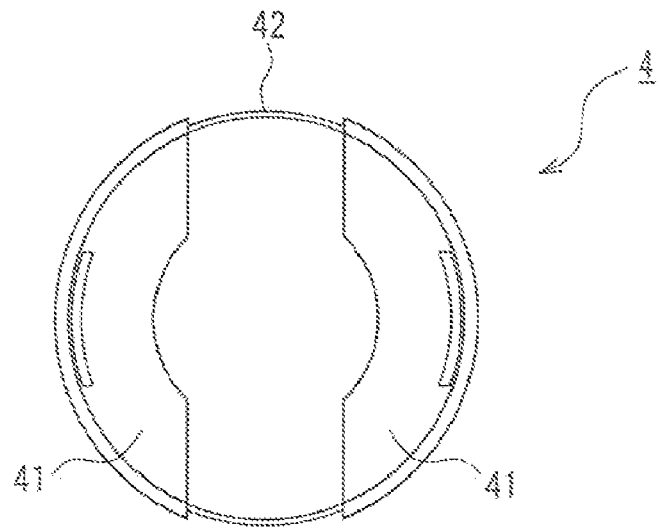
FIG. 9C is a bottom view of the support member shown in FIG. 9A.
Figure 9D:
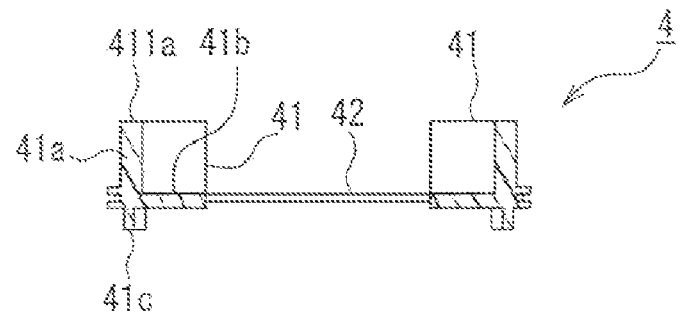
FIG. 9D is a cross-sectional view of the support member shown in FIG. 9A taken along line F-F.

Next is a detailed description of the support member with reference to FIGS. 9A to 9D. FIG. 9A is a plan view of the support member used to configure the tape cartridge of this embodiment. FIG. 9B is a front view of the support member shown in FIG. 9A, FIG. 9C is a bottom view of the support member shown in FIG. 9A, and FIG. 9D is a cross-sectional view of the support member shown in FIG. 9A taken along line F-F. As shown in FIGS. 9A to 9D, the support member 4 is configured front the pair of movable pieces 41, and an elastic body 42 that biases the pair of movable pieces 41 such that they approach each other.

Each of the movable pieces 41 is provided with a first pedestal portion 41a, the second pedestal portion 41b, and the operating portion 41c. In a state in which the reel 2 is in contact with the second container 1b and the interposing member 8 is in contact with the reel 2 (see FIG. 13A), an end face 411a of the first pedestal portion 41a is positioned immediately below the interposing member 8 and makes contact with the bottom portion 8b (see FIG. 6D) of the interposing member 8. In a state in which the first pedestal portion 41a has been disposed to the outside of the interposing member 8 and not positioned immediately under the interposing member 8, the second pedestal portion 41b makes contact with the bottom portion 8b (see FIG. 6D) of the interposing member 8 (see FIGS. 10A and 10B). The operating portion 41c is disposed in the first through-hole 15 (see FIG. 7A). By slidabiy moving the operating portion 41c within the first through-hole 15 in the radial direction of the reel, it is possible to change the position of the first pedestal portion 41a in the case, and the pair of movable pieces 41 can be caused to approach or move away from each other. Sliding operation of the operating portion 41 can be performed, for example, at the timing desired by a user, or can be performed using an example of the recording/reproducing apparatus described below.

As shown in FIG. 9D, the movable pieces 41 have a structure in which the first pedestal portion 41a is erected approximately perpendicular to the second pedestal portion 41b, and the cross-sectional shape of the portion remaining after excluding the operating portion 41c of the movable pieces 41 is approximately L-shaped. As shown in FIG. 9A, the shape is for example arc-like when the movable pieces 41 are viewed from above. An arc-shaped groove is formed in the side face of each movable piece 41, and a ring-shaped elastic member 42 is installed in this groove.

The pressure received by the movable pieces 41 in the direction of the cartridge face due to the bias provided by the elastic member 42 is preferably larger than the pressure received by the interposing member 8 due to the bias provided by the second spring-like elastic body 28. In this case, there is more stability in the locked state.

Next is a description of an example of the way in which the support member 4 is displaced by operation of the operating portion 41c, with reference to FIGS. 10A to 13B. FIGS. 10A, 11A, 12A, and 13A are enlarged cross-sectional views of the tape cartridge shown in FIG. 1 taken along line A-A, and FIGS. 10B, 11B, 12B, and 13B are enlarged cross-sectional views of the tape cartridge shown in FIG. 1 taken along line B-B.

For the sake of convenience of description, the second container 1b shown in FIGS. 10A to 13B is omitted from FIG. 1. Also, the first container 1a is disposed below the second container 1b in FIGS. 10A to 13B, but in ordinary use the first container 1a is disposed above the second container 1b.

Figure 10A:
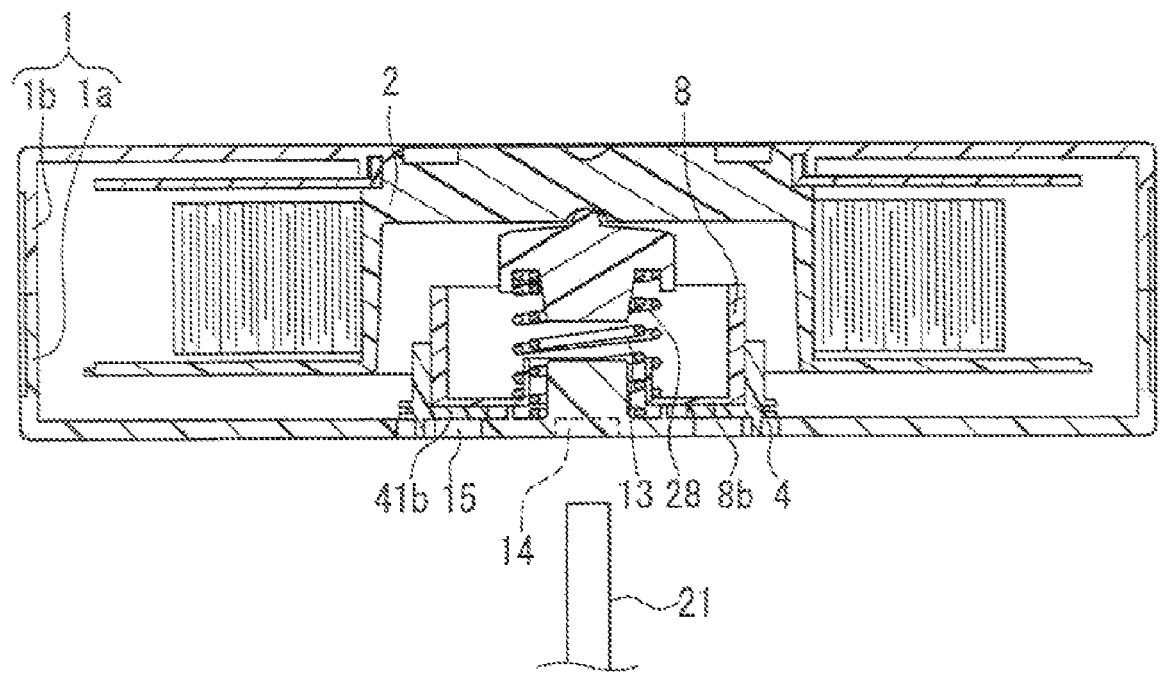
FIG. 10A is a cross-sectional view that illustrates how the support member is displaced by operation of an operating portion, and is an enlarged cross-sectional view of the tape cartridge shown in FIG. 1 taken along line A-A.
Figure 10B:
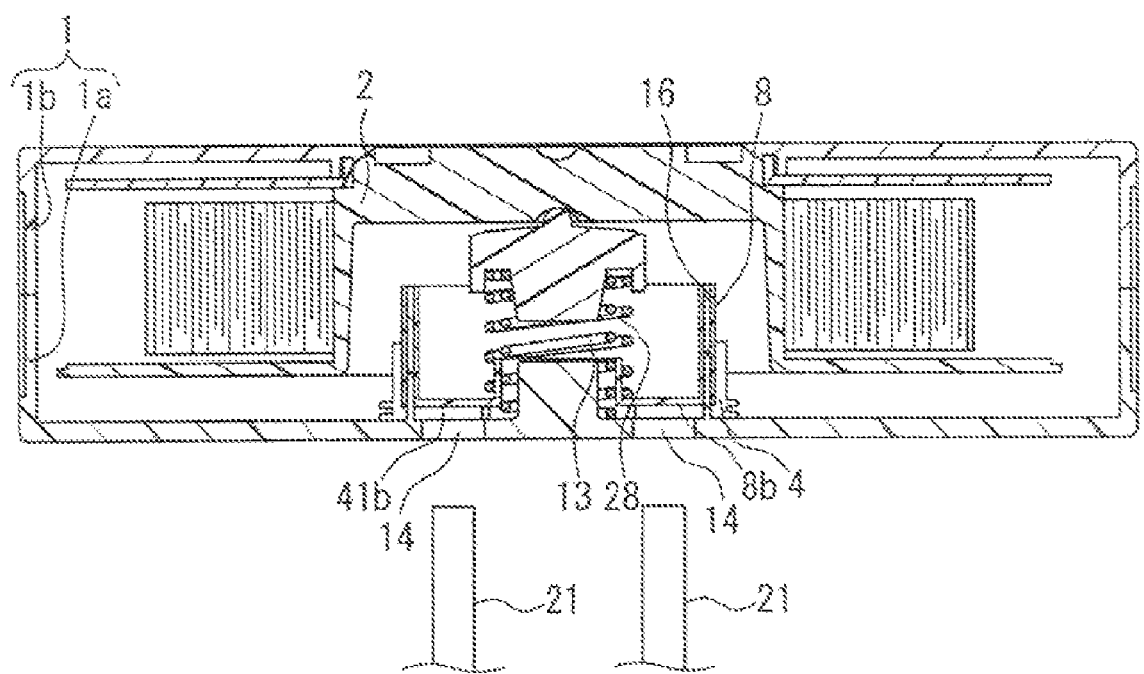
FIG. 10B is a cross-sectional view that illustrates how the support member is displaced by operation of an operating portion, and is an enlarged cross-sectional view of the tape cartridge shown in FIG. 1 taken along line B-B.

In FIGS. 10A and 10B, the bottom portion 8b of the interposing member 8 is in contact with the second pedestal portion 41b of the support member 4. At this time, the reel 2 is pushed against the second container 1b by biasing force of the first spring-like elastic body 13 and the second spring-like elastic body 28. However, for example, when a shock is applied to the tape cartridge due to being dropped or the like, due to the first spring-like elastic body 13 and the second spring-like elastic body 28 being compacted together, the reel 2 may wobble inside the case 1, collide with the inner wall of the case, or the like.

Figure 11A:
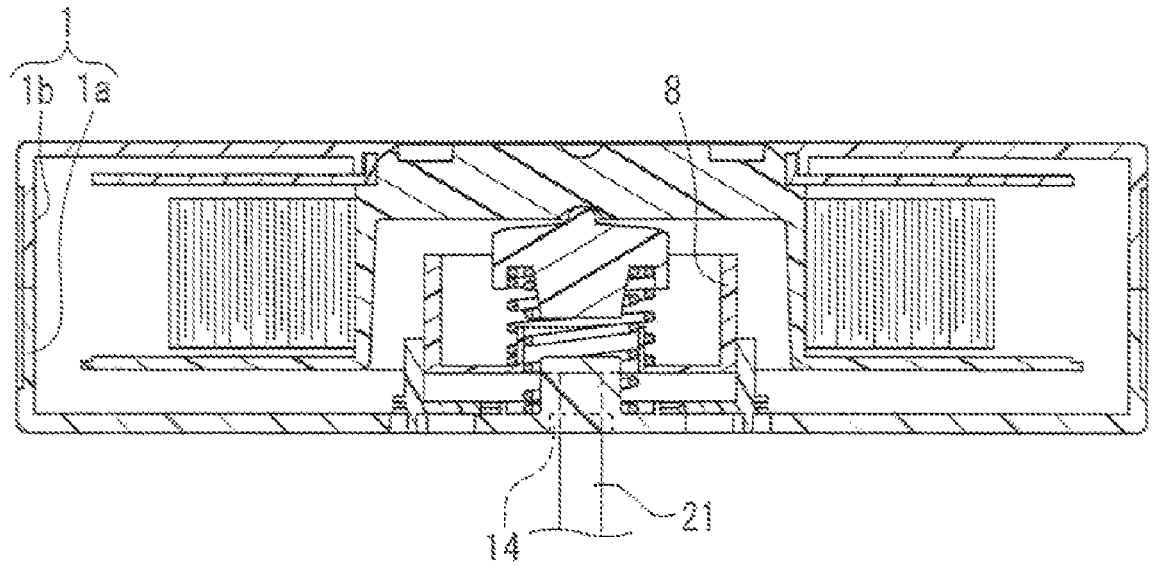
FIG. 11A is a cross-sectional view that illustrates how the support member is displaced by operation of an operating portion, and is an enlarged cross-sectional view of the tape cartridge shown in FIG. 1 taken along line A-A.
Figure 11B:
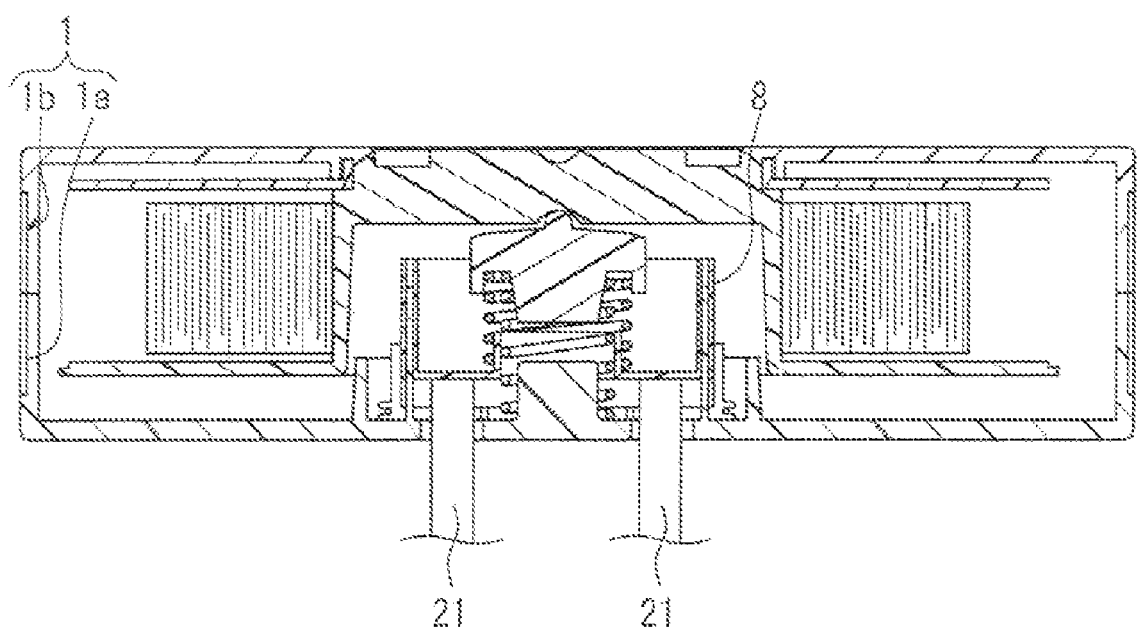
FIG. 11B is a cross-sectional view that illustrates how the support member is displaced by operation of an operating portion, and is an enlarged cross-sectional view of the tape cartridge shown in FIG. 1 taken along line B-B.
Figure 12A:
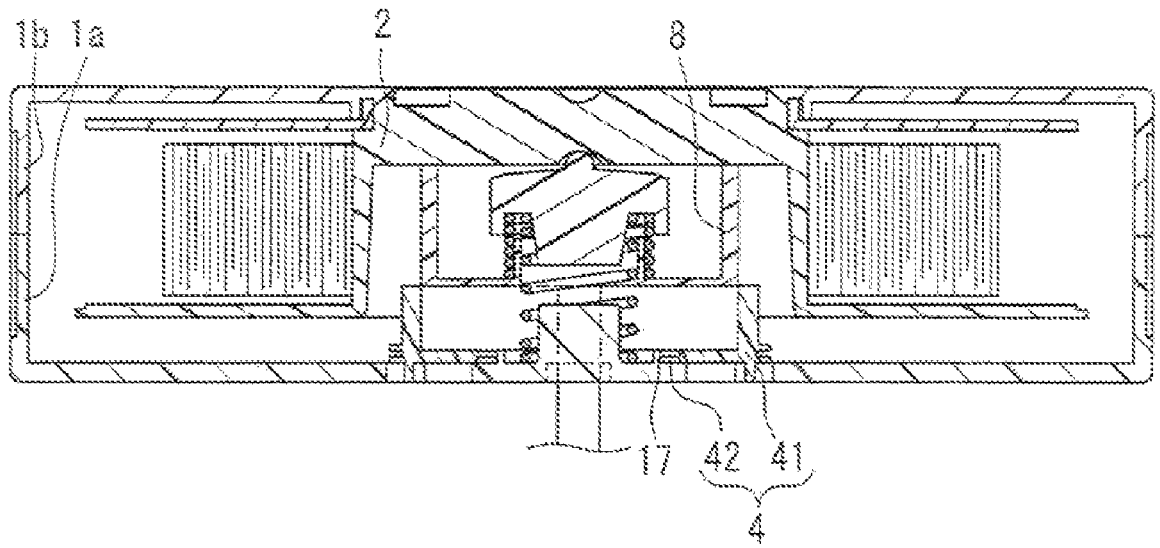
FIG. 12A is a cross-sectional view that illustrates how the support member is displaced by operation of an operating portion, and is an enlarged cross-sectional view of the tape cartridge shown in FIG. 1 taken along line A-A.
Figure 12B:
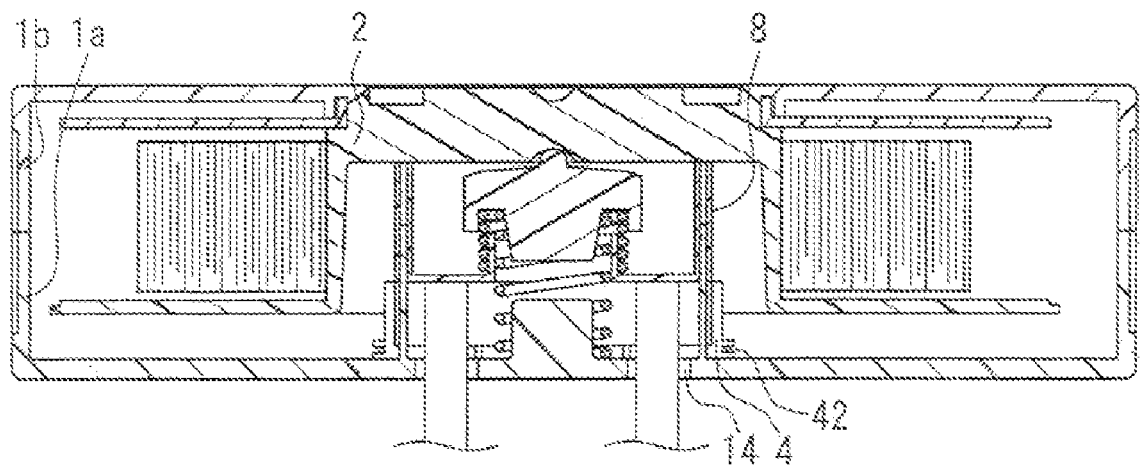
FIG. 12B is a cross-sectional view that illustrates how the support member is displaced by operation of an operating portion, and is an enlarged cross-sectional view of the tape cartridge shown in FIG. 1 taken along line B-B.
Figure 13A:
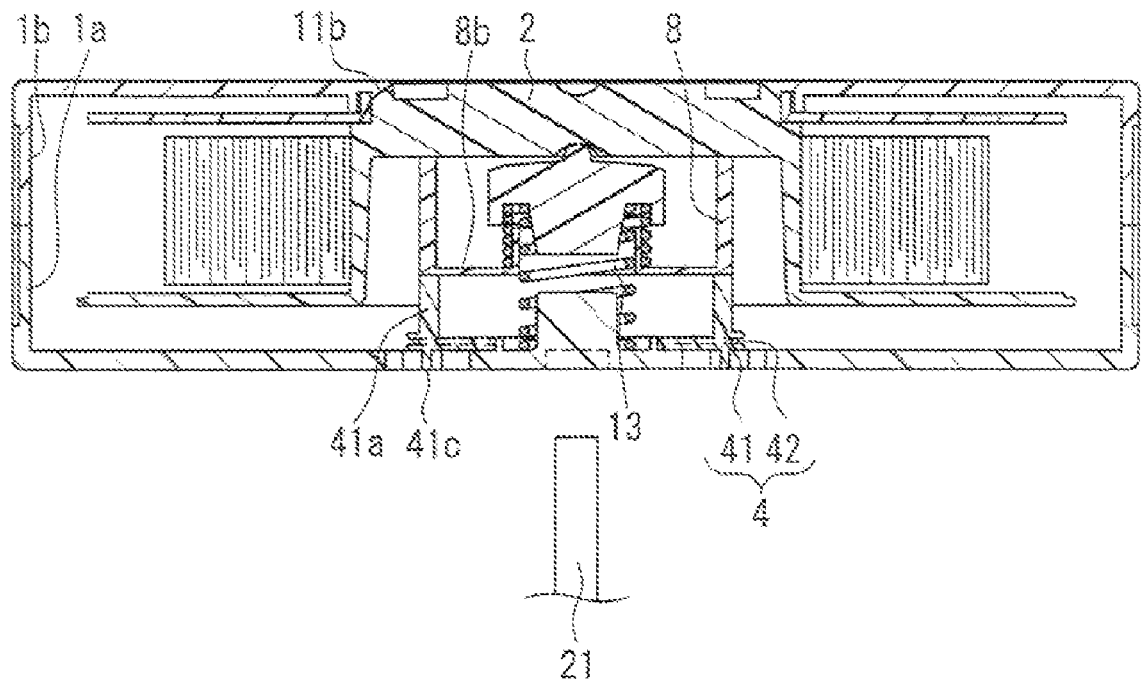
FIG. 13A is a cross-sectional view that illustrates how the support member is displaced by operation of an operating portion, and is an enlarged cross-sectional view of the tape cartridge shown in FIG. 1 taken along line A-A.
Figure 13B:
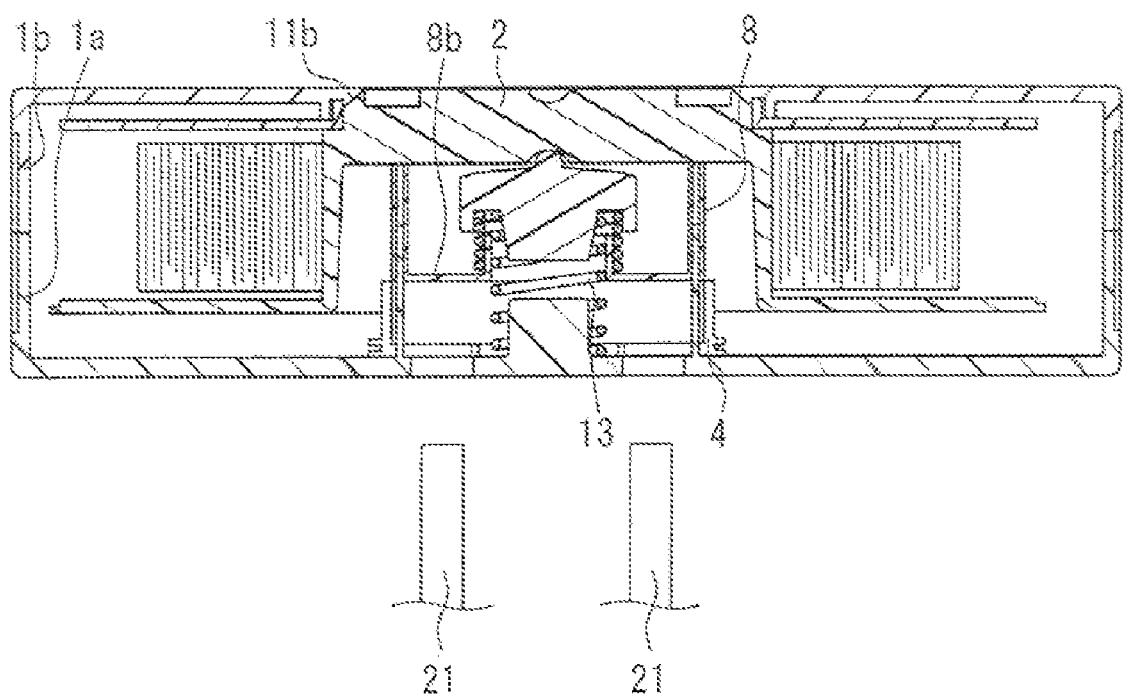
FIG. 13B is a cross-sectional view that illustrates how the support member is displaced by operation of an operating portion, and is an enlarged cross-sectional view of the tape cartridge shown in FIG. 1 taken along line B-B.

When a rod-like object 21 such as a pin is inserted into the case 1 from the second through-hole 14, the tip of the rod-like object 21 reaches the bottom portion 8b of the interposing member 8. When the rod-like object 21 is deeply inserted into the case 1 in opposition to the biasing force of the first spring-like elastic body 13 and the second spring-like elastic body 28, as shown in FIGS. 11A and 11B, the interposing member 8 is pushed upward by the rod-like object 21 to the side of the second container 1b, and as shown in FIGS. 12A and 12B, the interposing member 8 makes contact with the inner face of the bottom of the reel 2. When the pair of movable pieces 41 enter a state of non-contact with the interposing member 8 due to the interposing member 8 being pushed upward to the side of the second container 1b, the pair of movable pieces 41 are automatically moved in the radial direction by the biasing force of the ring-like elastic body 42 used to configure the support member 4, reducing the distance of the pair of movable pieces 41 from each other. The movable pieces 41 make contact with the control rib 17 provided in the bottom of the first container 1a, are stopped there, and as shown in FIGS. 13A and 13B, the first pedestal portion 41a of the movable pieces 41 is disposed immediately below the bottom portion 8b of the interposing member 8. In this state, even if the rod-like object 21 is removed from within the case, in a state with the reel 2 pushed against the second container 1b, and the interposing member 8 pushed against the inner face of the bottom of the reel 2, support is provided by the support member 4, which is configured from the pair of movable pieces 41 and the elastic body 42.

In such a state, wobbling of the reel 2, collision with an inner wall of the case, or the like when an impact is applied to the tape cartridge is suppressed.

In the tape cartridge of this embodiment, the interposing member 8 is constituted from impact-resistant material, and is disposed in approximately the center of the cavity in the hub portion of the reel 2, so it is possible to uniformly absorb and mitigate external force from any direction, and wobbling, positional displacement, or the like of the reel 2 can be effectively suppressed. Thus, it is possible to reduce deformation of the reel 2 and edge crimps of the tape, and also possible to reduce case deformation or damage.

Also, in the tape cartridge of this embodiment, the support member is provided with the operating portion 41c, which allows operation of the support member 4 to be controlled from outside of the case, and the second through-hole 14 for pushing up the interposing member 8 to the side of the second container 1b using the rod-like object 21 is formed in the case. Thus, the user can fix and retain the reel 2 at a desired time, such as when transporting or handling the tape cartridge.

As described above, the interposing member 8, the support member 4 disposed between the interposing member 8 and the first container 1a, and the like function as a lock mechanism that suppresses wobbling, positional displacement and the like of the reel 2.

In order to make it possible to realize such a reel lock mechanism, the height of the interposing member 8 (length in the thickness direction of the case) and the height of the support member 4 (length in the thickness direction of the case) are set such that the sum of the height of the interposing member 8 and the height of the support member 4 is about the same as the distance from the inner face of the bottom of the hub portion of the reel 2 in a state in contact with the second container 1b to the inner face of the bottom of the first container 1a. When increasing the height of the interposing member 8, the height of the support member 4 may be reduced a corresponding amount, and when reducing the height of the interposing member 8, the height of the support member 4 may be increased a corresponding amount.

As shown in FIGS. 13A and 13B, in the present embodiment, a face 11b that makes contact with the reel 2 and is used to configure the opening portion of the second container 1b is a taper face corresponding to a taper face of the hub portion 2a, such that the surface area in contact with the reel 2 increases. Accordingly, if the sum of the height of the interposing member 8 (length in the thickness direction of the case) and the height of the support member 4 (length in the thickness direction of the case) is not strictly the same as the distance from the inner face of the bottom of the hub portion of the reel 2 in a state in contact with the second container 1b to the inner face of the bottom of the first container 1a, but is somewhat shorter, the interposing member 8 can be supported by the first pedestal portion 41a of the support member 4 such that the interposing member 8 cannot move vertically. Rather, as long as the function of the reel lock mechanism is not impaired, if the above sum is made somewhat shorter than the distance from the inner face of the bottom of the hub portion of the reel 2 in a state in contact with the second container 1b to the inner face of the bottom of the first container 1a, it is possible to smoothly perform sliding operation of the movable pieces 41, so such a configuration is preferable.

When support of the interposing member 8 by the first pedestal portion 41a is unnecessary, the operation portion 41c of the movable pieces 41 may be slid in the opposite direction. When each operating portion 41c is slid in the opposite direction to distance the pair of movable pieces 41 from each other, and the first pedestal portion 41a is shifted from directly under the interposing member 8, the interposing member 8 naturally drops to the side of the first container 1a due to the biasing force of the second spring-like elastic body 28, and thus the tape cartridge returns to the state shown in FIGS. 10A and 10B. In this state, the reel lock mechanism does not affect the behavior of the reel, so the tape cartridge of this embodiment can be used in the same manner as a conventional tape cartridge.

The material of the interposing member 8 is not particularly limited. For example, that material may be polycarbonate, polyacetal, or the like, and preferably is impact-absorbing material such as a urethane gel, polyolefin, urethane rubber, or the like, and in particular, elastic rubber with a hardness of 60 to 90 Hs is preferable.

The material of the movable pieces 41 used to configure the support member 4 is not particularly limited. For example, polyacetal, polycarbonate, or the like is suitable, and in particular, polyacetal is preferable. The material of the elastic member 42 used to configure the support member 4 is not particularly limited. For example, besides elasticized rubber, spring or elasticized fiber, elasticized resin-molded component, or the like may be used. The elasticized rubber may be for example natural rubber or the like, the elasticized fiber may be for example nylon or the like, and the elasticized resin may be for example polyurethane resin or the like.

In the tape cartridge described above, there are two of the first through-holes 15 and the second through holes 14, but the number of these holes is not particularly limited and may be decided according to necessity. The number of first through-holes 15 may be decided according to the number of movable pieces 41 used to configure the support member 4. The hole shape and formation position of first through-holes 15 and second through-holes 14 can be set as desired.

EMBODIMENT 2

Next is a description of an example of a recording/reproducing apparatus used for recording/reproduction of the tape cartridge of the present embodiment, and a description of the operation of recording and reproduction of information for the tape cartridge of the present embodiment by the recording/reproducing apparatus, with reference to FIGS. 14 to 17.

Figure 14:
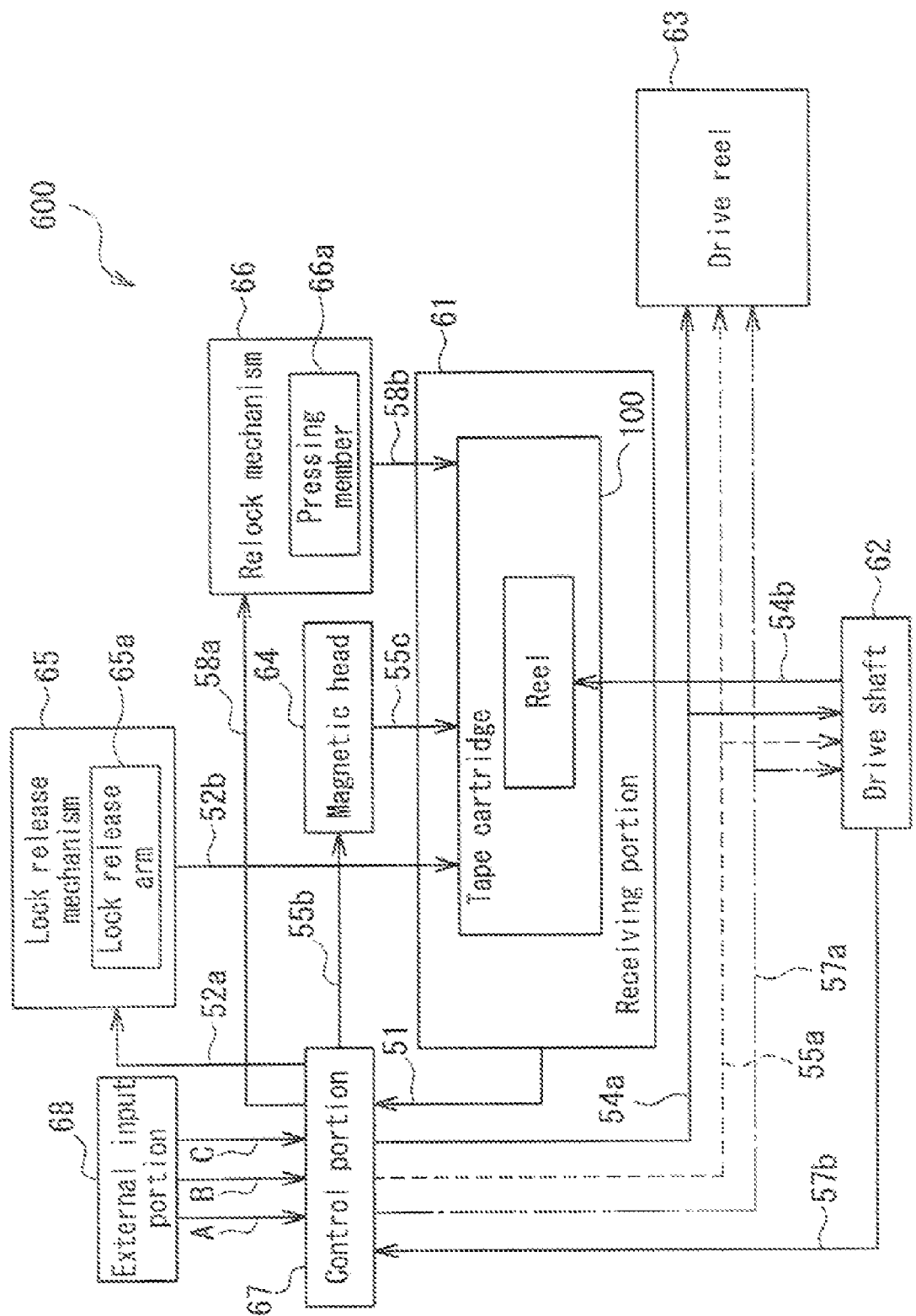
FIG. 14 is a block diagram that illustrates an example of the recording/reproducing apparatus of the present invention.

FIG. 14 is a block diagram that shows an example of the recording/reproducing apparatus of the present embodiment. As shown in FIG. 14, a recording/reproducing apparatus 600 of this embodiment includes a receiving portion 61, a drive shaft 62, a drive reel 63, a magnetic head 64, a lock release mechanism 65, a relocking mechanism 66, a control portion 67, and an external input portion 68.

The receiving portion 61 has a configuration and function to recognize that a tape cartridge 100 has been loaded in the receiving portion 61 and to transmit that fact to the control portion 67. Also, the receiving portion 61 has a configuration and function to recognize, via the control portion 67, a command from the external input portion 68 to remove the tape cartridge 100, and execute that command.

Figure 15:
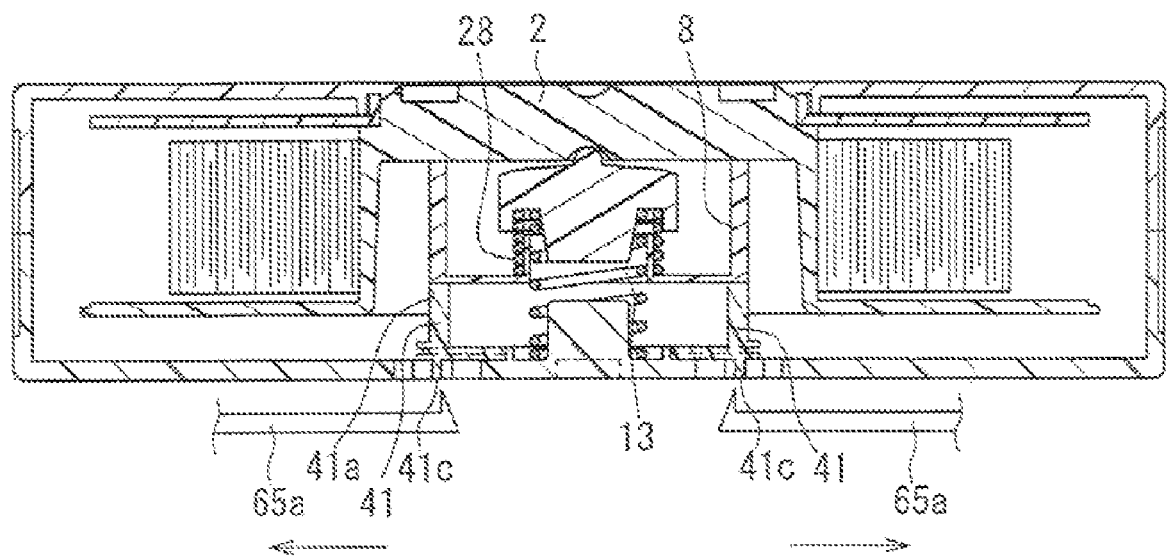
FIG. 15 is a conceptual diagram that illustrates an example of a lock release mechanism of an example of the recording/reproducing apparatus of the present invention.

The tape cartridge 100 is in the locked state immediately before being housed in the tape cartridge receiving portion 61. The lock release mechanism 65 has a configuration and function to be able to release the locked state of the tape cartridge 100 housed in the receiving portion 61. Specifically, the lock release mechanism 65, for example, includes a pair of lock release arms 65a as shown in FIG. 15, and with an instruction of the control portion 68, the operating portion 41c of the tape cartridge 100 is slidably operated by the lock release arms 65a. Thus, support of the interposing member 8 by the first pedestal portion 41a is released, thereby releasing the locked state.

The drive shaft 62 has a drive gear that can be engaged with the gear of the reel of the tape cartridge 100. The drive shaft 62 receives an instruction from the control portion 67, engages with the reel gear, and raises the reel in the case to a position along the drive system of the drive. Also, the drive shaft 62 receives an instruction from the external input portion 68 executed via the control portion 67, and with a rotary unit used to configure the drive shaft 62, the drive shaft 62 is rotatable in the direction that feeds out tape or the direction that reels in tape.

The drive reel 63 can reel in tape supplied from the tape cartridge 100. The drive reel 63 receives an instruction from the control portion 67, and with a rotary unit used to configure the drive reel 63, the drive reel is rotatable in the direction that reels in tape or the direction that feed out tape.

The magnetic head 64 can record information to the tape of the tape cartridge 100, and reproduce the recorded information.

Figure 16:
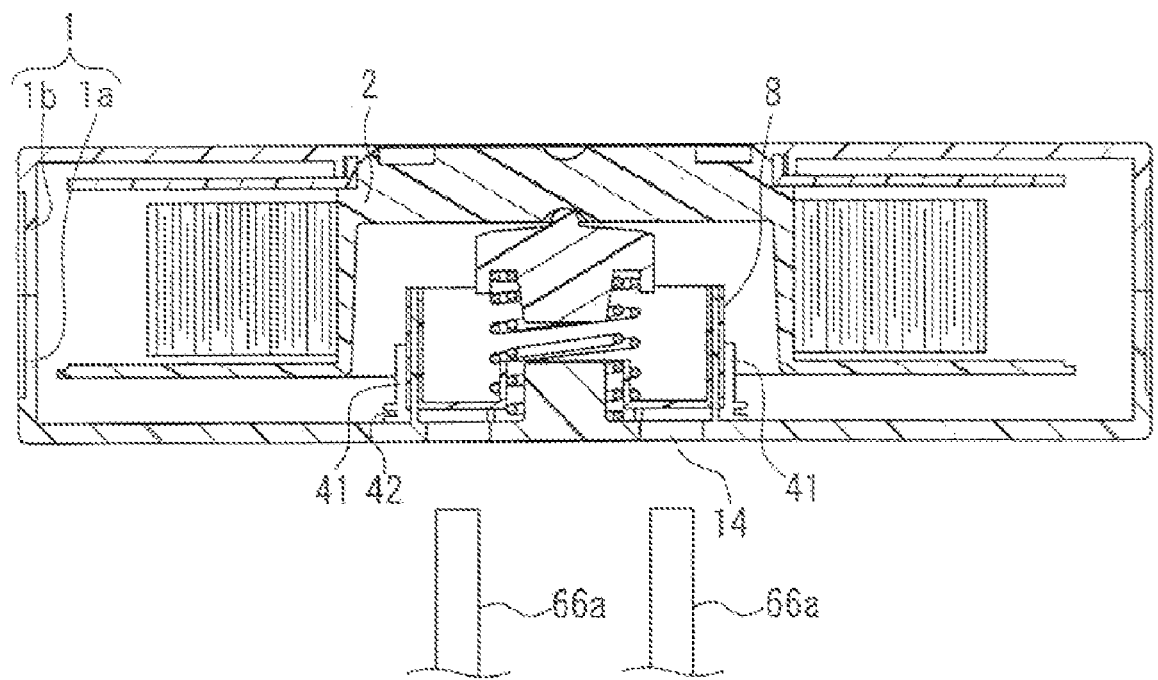
FIG. 16 is a conceptual diagram that illustrates an example of a re-locking mechanism of an example of the recording/reproducing apparatus of the present invention.
Figure 17:
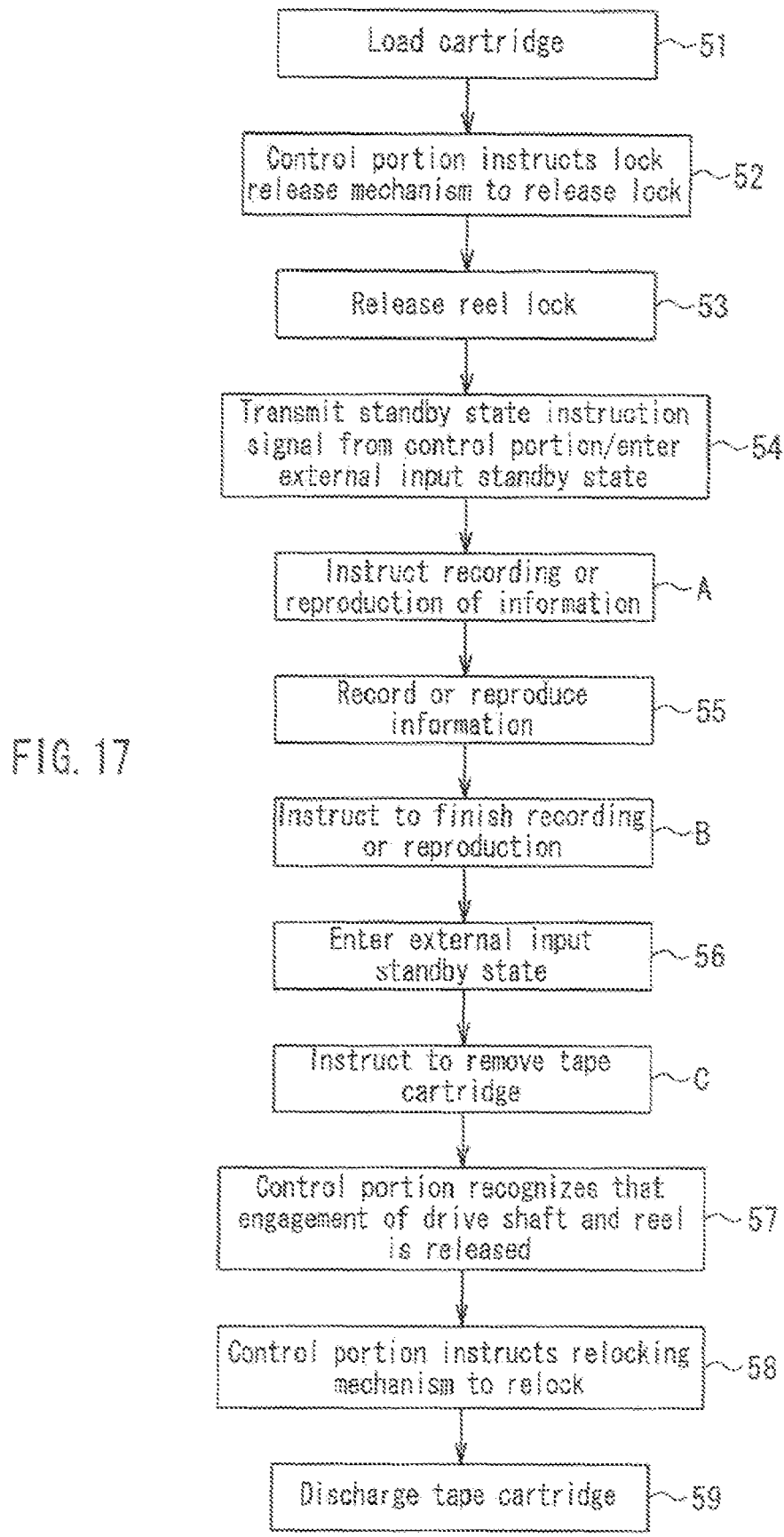
FIG. 17 is a flow chart that illustrates an example of the operation of an example of the recording/reproducing apparatus of the present invention.

The relocking mechanism 66 ha a configuration and function to return the released state to the locked state. Specifically, the relocking mechanism 66, for example, as shown in FIG. 16, is provided with a pressing member 66a. The pressing member 66a, due to an instruction from the control portion 67, can be inserted into the case 1 of the tape cartridge through the second through-hole 14 of the first container 1a used to configure the case 1, to press against the interposing member 8 until the interposing member makes contact with the reel 2, which is in contact with the second container 1b.

The external input portion 68 can be operated by a user in order to instruct the control portion 67 to record information to the tape, reproduce information recorded on the tape, remove the tape cartridge from the recording/reproducing apparatus, or the like.

Next is a description of the operation of an example of the recording/reproducing apparatus of the present invention, with reference to FIGS. 14 to 17.

First, when the tape cartridge 100 is inserted into the receiving portion 61, the receiving portion 61 recognizes that the tape cartridge 100 has been loaded, and transmits that fact as a signal to the control portion 67 (Step 51). The tape cartridge 100 is in the locked state immediately before being inserted into the receiving portion 61.

After receiving the signal (51) that the tape cartridge 100 has been recognized from the receiving portion 61, the control portion 67 instructs (52a) the lock release mechanism 65 to release the locked state of the tape cartridge 100 (Step 52). Specifically, the control portions 41c of the tape cartridge 100 are slidably operated by the lock release arms 65a constituting the lock release mechanism 65 (52b), thus pulling the pair of movable pieces 41 away from each other (see FIG. 15). Thus, support of the interposing member 8 by the first pedestal portion 41a is released, so that the locked state of the reel is released, and the interposing member 8 drops to the side of the first container 1a due to the biasing force of the second spring-like elastic body 28 (Step 53, see FIG. 2A).

when the locked state of the reel is released, a standby state instruction signal (54a) is transmitted by the control portion 67, and the drive gear of the drive shaft 62 engages with the gear of the reel of the tape cartridge (54b). Next, the reel of the tape cartridge and the drive reel 63 begin to rotate at the same time, so that a predetermined length of tape is fed out from the reel, and that predetermined length of tape is reeled in by the drive reel 63, and the tape cartridge enters and external input standby state (step 54).

Next, when the external input portion 68 gives, for example, an instruction to record or reproduce information (A), that instruction is given to the drive shaft 62, the drive reel 63, and the magnetic head 64 via the control portion 67 (55a, 55b), and thus recording or reproduction of information is begun (55c, Step 55).

Next, when the external input portion 68 gives an instruction to finish recording or reproduction (B) to the drive shaft 62, the drive reel 63, and the magnetic head 64 via the control portion 67, the recording/reproducing apparatus and the tape cartridge again enter the external input standby state (Step 56).

Next, when the external input portion 68 gives a command (C) to remove the tape cartridge, the control portion 67 transmits a tape removal signal to the drive shaft 62 and the drive reel 63 (57a). Thus, the drive shaft 62 and the drive reel 63 rotate and the tape is completely reeled in by the reel of the tape cartridge. When reeling in of the tape is finished, engagement of the drive shaft 62 and the reel of the tape cartridge is released. When engagement of the drive shaft 62 and the reel of the tape cartridge is released, this is recognized by the control portion 67 (57b, Step 57).

Then, a signal is transmitted from the control portion 67 to the relocking mechanism 66 (58a, Step 58). Thus, as shown in FIG. 16, the pressing members 66a constituting the relocking mechanism 66 are inserted into the second through-holes 14 of the tape cartridge, and the interposing member 8 is pressed against with the pressing members 66a until the interposing member 8 makes contact with the reel 2, which is in contact with the second container 1b (58b). The pair of movable pieces 41, which are in a state of non-contact with the interposing member 8, slide near each other due being biased by the elastic body 42, and thus, the first pedestal portion of each movable piece 41 is disposed immediately below the interposing member 8. After relocking has been performed in this manner, the tape cartridge is discharged from the receiving portion 61 of the recording/reproducing apparatus (Step 59).

Also, the recording/reproducing apparatus of the present embodiment may be provided with tow or more arms allowing the two or more movable pieces 41 to slide so as to near each other, in order for relocking to be more smoothly performed. In this case, these arms may also be used as the lock release arms 65a constituting the lock release mechanism.

Further, the lock release arms 65a are not limited to the form shown in FIG. 15. Likewise, the pressing members 66a are not limited to the form shown in FIG. 16. Also, the configuration of the recording/reproducing apparatus of the present invention and the operation of each configuration are not limited to the examples shown in FIGS. 14 and 17; a configuration may also be adopted in which in addition to the lock release mechanism 65 and the relocking mechanism 66 being provided and the control portion 67 being able to control the lock release mechanism 65 and the relocking mechanism 66, a publicly-known configuration possessed by a conventional recording/reproducing apparatus is provided, and each configuration is operated in the same manner as in the related art.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

As described above, according to the present invention, it is possible to provide a tape cartridge in which when the tape cartridge is not loaded, wobbling of the reel in a drive is prevented and also an impact applied to the reel is mitigated. Also, according to the present invention it is possible to provide a recording/reproducing apparatus for recording information to an example of the tape cartridge of the present invention, and for reproducing the recorded information.

With the tape cartridge of the present invention, when the tape cartridge is not loaded, wobbling of the reel in a drive is prevented and also an impact applied to the reel is mitigated, so the tape cartridge of the present invention is useful as a tape cartridge.

What is claimed is:

1. A tape cartridge, comprising:
   a case formed with a first container and a second container fitted together so as to form an internal space, the case having a first through-hole and a second through-hole in the bottom of the first container;
   a reel disposed within the case and having a cylindrical hub portion with a bottom;
   a tape wound around the hub portion such that the tape can be fed out; and
   a reel lock mechanism that allows the reel to be immovably supported;
   wherein the reel lock mechanism comprises an interposing member that can move vertically in the thickness direction of the case, and a support member; and
   the support member comprises:
   a first pedestal portion that, in a state in which the reel has been put in contact with the second container and the interposing member has been put in contact with the reel, is positioned immediately below the interposing member and thus immovably supports the interposing member; and
   an operating portion that is disposed in the first through-hole and allows, with a predetermined operation, support of the interposing member and release of support of the interposing member.

2. The tape cartridge according to claim 1, wherein the interposing member is disposed such that the interposing member can move vertically within a cavity of the hub portion.

3. The tape cartridge according to claim 1, wherein the predetermined operation is operation by sliding.

4. The tape cartridge according to claim 1, wherein the support member comprises two or more movable pieces whose distance from each other can be altered, each movable piece being provided with an operating portion.

5. The tape cartridge according to claim 4, wherein the support member further comprises an elastic member that biases the two or more movable pieces such that the two or more movable pieces approach each other.

6. The tape cartridge according to claim 1, wherein the interposing member is disposed in approximately the center of the cavity of the hub portion.

7. The tape cartridge according to claim 1, wherein the material of the interposing member comprises an impact-absorbing material.

8. The tape cartridge according to claim 1,
   wherein the tape cartridge comprises a shaft member disposed in the cavity of the hub portion, the shaft member being in contact with the reel, and a first spring-like elastic body; and
   the reel is pressed and biased to the side of the second container by elastic repulsive force of the first spring-like elastic body that acts via the shaft member.

9. The tape cartridge according to claim 8, further comprising a second spring-like elastic body, one end of the second spring-like elastic body contacting the shaft member and the other end of the second spring-like elastic body contacting the interposing member.

10. The tape cartridge according to claim 1, wherein the first container further comprises an interposing member guide member provided erected in the thickness direction of the case from a bottom portion of the first container, the interposing member guide member being able to guide vertical movement of the interposing member while hindering lateral movement and rotational movement of the interposing member.

11. The tape cartridge according to claim 10, wherein the interposing member further comprises a through-hole into which the interposing member guide member has been inserted.

12. The tape cartridge according to claim 1,
   wherein the interposing member is disposed so as to be movable vertically in the hub portion;
   the support member comprises two or more movable pieces whose distance from each other is variable, and an elastic member that biases the two or more movable pieces such that the two or more movable pieces approach each other, each movable piece being provided with an operating portion, and the predetermined operation being operation by sliding;
   the tape cartridge comprises a shaft member in contact with the reel disposed in the cavity of the hub portion, and a first spring-like elastic body, and the reel is pressed and biased to the side of the second container by elastic repulsive force of the first spring-like elastic body that acts via the shaft member; and
   the tape cartridge further comprises a second spring-like elastic body, one end of the second spring-like elastic body contacting the shaft member and the other end of the second spring-like elastic body contacting the interposing member.

13. A recording/reproducing apparatus for recording to or reproducing information from the tape cartridge according to claim 12, the recording/reproducing apparatus comprising:
   a receiving portion that allows the tape cartridge to be housed;
   a drive shaft having a drive gear that can engage with the reel;
   a drive reel that can reel in tape supplied from the tape cartridge;
   a magnetic head for recording information to the tape and reproducing information recorded to the tape;
   a lock release mechanism that allows releasing of a locked state in which the first pedestal portion is positioned immediately below the interposing member so that the support member immovably supports the interposing member;
   a relocking mechanism that returns that lock release state to the locked state; and
   a control portion that controls operations of the receiving portion, the drive shaft, the drive reel, the magnetic head, the lock release mechanism, and the relocking mechanism.

14. The recording/reproducing apparatus according to claim 13, wherein the lock release mechanism comprises a lock release arm that allows releasing of support of the interposing member by the first pedestal portion, by slidably operating the control portion of the tape cartridge.

15. The recording/reproducing apparatus according to claim 13, wherein the relocking mechanism comprises a pressing member that can be inserted into the case of the tape cartridge through the second through-hole, and can press against the interposing member until the interposing member makes contact with the reel, which is in contact with the second container.

* * * * *